(12) United States Patent
Sagou et al.

(10) Patent No.: US 9,950,589 B2
(45) Date of Patent: Apr. 24, 2018

(54) AIR CONDITIONER FOR VEHICLE

(75) Inventors: Yasuhiro Sagou, Chiryu (JP); Manabu Maeda, Nagoya (JP); Shinichirou Hirai, Ichinomiya (JP); Yoshinori Yanagimachi, Takahama (JP); Koji Wakabayashi, Anjo (JP); Koji Ota, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 1494 days.

(21) Appl. No.: 13/308,862

(22) Filed: Dec. 1, 2011

(65) Prior Publication Data

US 2012/0142264 A1 Jun. 7, 2012

(30) Foreign Application Priority Data

Dec. 7, 2010 (JP) .................................. 2010-272554
Oct. 12, 2011 (JP) .................................. 2011-225075

(51) Int. Cl.
*B60H 1/34* (2006.01)
*B60H 1/00* (2006.01)

(52) U.S. Cl.
CPC ..... *B60H 1/00842* (2013.01); *B60H 1/00735* (2013.01); *B60H 1/00742* (2013.01); *B60H 1/00764* (2013.01)

(58) Field of Classification Search
CPC ............ B60H 1/00735; B60H 1/00742; B60H 1/00764; B60H 1/00842; B60H 1/34
USPC ........................................................ 454/75
See application file for complete search history.

(56) References Cited

U.S. PATENT DOCUMENTS

| 3,908,900 | A | * | 9/1975 | Smith ..................... 237/12.3 A |
| 5,450,894 | A | * | 9/1995 | Inoue et al. .................... 165/43 |
| 6,105,667 | A | * | 8/2000 | Yoshinori et al. ............ 165/202 |
| 6,386,965 | B1 | * | 5/2002 | Greenwald et al. ............ 454/75 |
| 6,454,178 | B1 | | 9/2002 | Fusco et al. |
| 6,758,739 | B1 | * | 7/2004 | Sangwan ............... B60H 1/008 454/139 |
| 6,871,696 | B2 | * | 3/2005 | Aoki et al. ...................... 165/43 |

(Continued)

FOREIGN PATENT DOCUMENTS

| JP | 5-254331 | 10/1993 |
| JP | 2001-315520 | 11/2001 |

(Continued)

*Primary Examiner* — Steven B McAllister
*Assistant Examiner* — Samantha Miller
(74) *Attorney, Agent, or Firm* — Harness, Dickey & Pierce, P.L.C.

(57) ABSTRACT

A vehicle air conditioner includes a blower for blowing air into a space of a vehicle compartment, and an air-conditioning mode switching portion for switching between air conditioning modes. The air conditioning modes include a normal air conditioning mode in which air conditioning of a specific region including a driver seat and air conditioning of a non-specific region not including the specific region in the space of the vehicle compartment are performed, and a specific-region prioritizing air conditioning mode in which an air conditioning capability for the non-specific region is decreased as compared to the normal air conditioning mode. The air-conditioning mode switching portion adjusts the air conditioning capability for the non-specific region based on a pressure of air drawn into the blower, in the specific-region prioritizing air conditioning mode.

19 Claims, 28 Drawing Sheets

(56) References Cited

U.S. PATENT DOCUMENTS

| | | | |
|---|---|---|---|
| 7,793,706 B2* | 9/2010 | Archibald et al. | 165/42 |
| 7,827,805 B2* | 11/2010 | Comiskey et al. | 62/3.3 |
| 7,828,050 B2* | 11/2010 | Esaki | 165/202 |
| 8,382,563 B2* | 2/2013 | Sievers et al. | 454/126 |
| 8,393,162 B2* | 3/2013 | Chung | 62/3.61 |
| 8,932,119 B2* | 1/2015 | Suetake et al. | 454/75 |
| 2003/0037918 A1* | 2/2003 | Lee et al. | 165/202 |
| 2011/0114739 A1 | 5/2011 | Misumi et al. | |
| 2012/0315835 A1* | 12/2012 | Maranville et al. | 454/75 |

FOREIGN PATENT DOCUMENTS

| | | |
|---|---|---|
| JP | 2002-046455 | 2/2002 |
| JP | 2005-145327 | 6/2005 |
| JP | 2009-292293 | 12/2009 |
| JP | 2012-071814 A | 4/2012 |
| WO | WO 2011/070780 | 6/2011 |

* cited by examiner (ONE-SEAT CONCENTRATION FACE MODE)

(ONE-SEAT CONCENTRATION BI-LEVEL MODE)

(ONE-SEAT CONCENTRATION FOOT MODE)

(INSIDE AIR MODE
VEHICLE SPEED 100km
BLOWER M3)

(OUTSIDE AIR MODE
VEHICLE SPEED 100km
BLOWER M3)

(OUTSIDE AIR MODE
VEHICLE SPEED 100km
BLOWER M1)

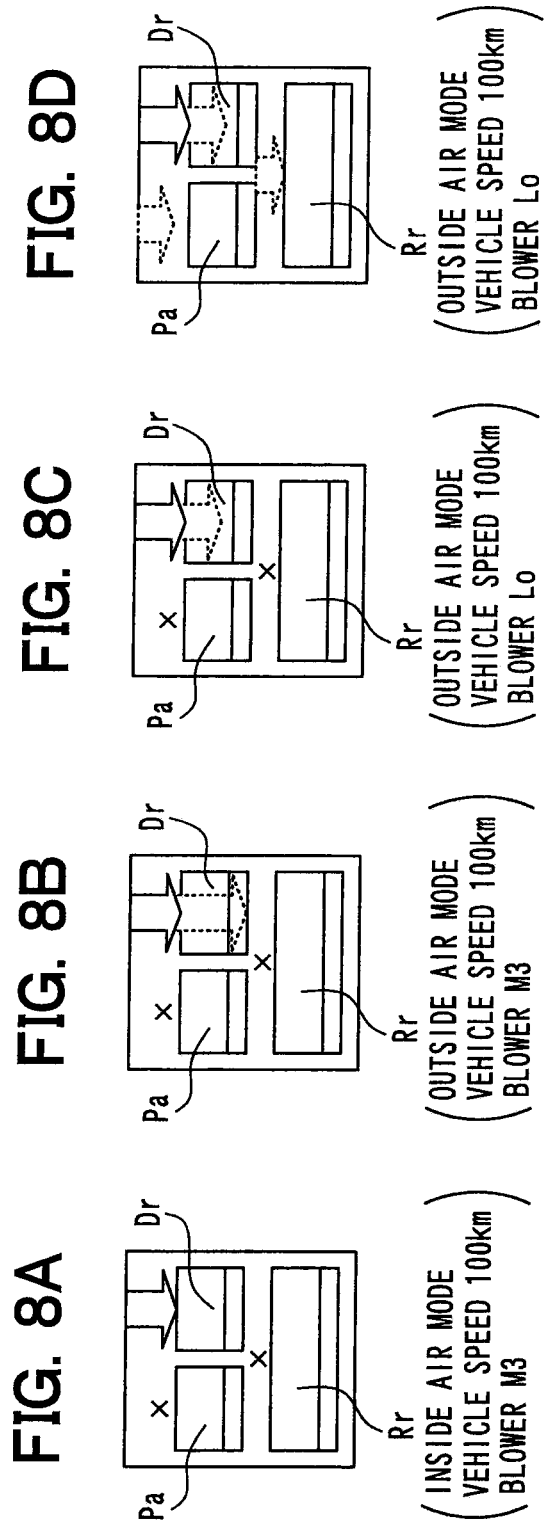

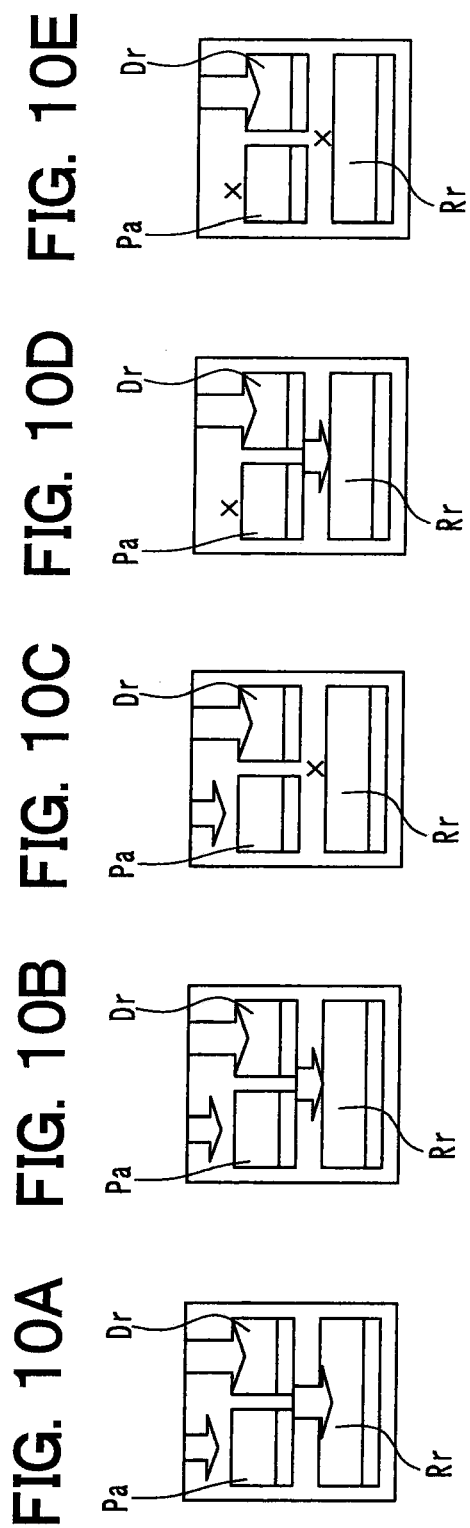

(HIGH LOAD)

(INTERMEDIATE LOAD)

(LOW LOAD)

(INTERMEDIATE FACE MODE)

(ONE-SEAT CONCENTRATION FACE MODE)

(ONE-SEAT CONCENTRATION BI-LEVEL MODE)

(ONE-SEAT CONCENTRATION FOOT MODE)

(INTERMEDIATE FOOT MODE)

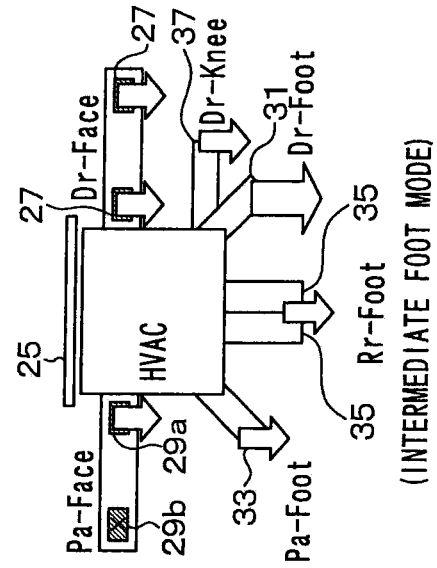
FIG. 25A (INTERMEDIATE FACE MODE)
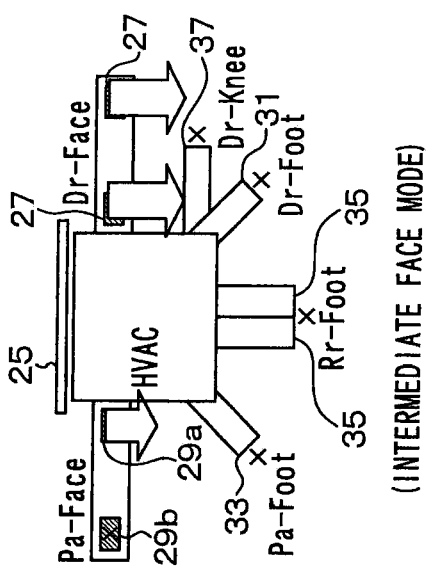
FIG. 25B (INTERMEDIATE FOOT MODE)

AIR CONDITIONER FOR VEHICLE

CROSS REFERENCE TO RELATED APPLICATION

This application is based on Japanese Patent Applications No. 2010-272554 filed on Dec. 7, 2010, and No. 2011-225075 filed on Oct. 12, 2011, the disclosure of which is incorporated herein by reference.

TECHNICAL FIELD

The present invention relates to an air conditioner for a vehicle.

BACKGROUND

Conventionally, an air conditioner including an occupied seat sensor that is provided at a seat inside a vehicle compartment to determine a seat occupied state is disclosed (for example, in JP Patent No. 2960243, and JP Patent No. 3573682). The air conditioner controls the blowing state of an air conditioning unit according to a signal from the occupied seat sensor.

The air conditioner in the related art includes a driver-seat side air outlet, a front-passenger-seat side air outlet, a right rear-seat side air outlet, and a left rear-seat side air outlet. The air conditioner is designed to blow out a conditioned air only from the air outlet for the seat which is determined to be occupied, and not to blow out the conditioned air from the air outlet for the seat which is determined not to be occupied by a passenger, whereby power saving is achieved.

Further, the air conditioner in the related art can introduce inside air and outside air into the air conditioning unit, and also can control the ratio of introduction of the inside air to the outside air if necessary.

In the related art, however, when a vehicle speed is increased while the outside air is introduced, the flow amount of the outside air introduced into the air conditioning unit is increased depending on a ram pressure (traveling dynamic pressure), and together with this, the flow amount of conditioned air blown into the vehicle compartment is also increased.

Thus, the conditioned air is blown only from the air outlet for the seat which is determined to be occupied, and is not blown from the air outlet for the seat which is determined not to be occupied by any passenger. In this case, the flow amount of conditioned air blown from the air outlet for the seat determined to be occupied would become excessive. In other words, the air conditioning power is concentrated on a specific passenger more than necessary, which would make the passenger feel uncomfortable.

SUMMARY

The present disclosure has been made in view of the forgoing matters, and it is an object of the present invention to suppress the degradation of comfort to the passenger, while saving the power.

To achieve the above object, according to a first aspect of the present disclosure, an air conditioner for a vehicle includes a blower which blows air into a space of a vehicle compartment, and an air-conditioning mode switching portion configured to switch between air conditioning modes. The air conditioning modes include: a normal air conditioning mode in which air conditioning of a specific region including a driver seat in the space of the vehicle compartment, and air conditioning of a non-specific region not including the specific region in the space of the vehicle compartment are performed; and a specific-region prioritizing air conditioning mode in which an air conditioning capability for the non-specific region is decreased as compared to the normal air conditioning mode. The air-conditioning mode switching portion adjusts the air conditioning capability for the non-specific region based on a pressure of air drawn into the blower, in the specific-region prioritizing air conditioning mode.

Thus, a concentration degree of the air conditioning capacity with respect to a passenger in the specific region can be changed, and thereby suppressing the degradation of comfort to the passenger, while saving the power.

For example, according to a second aspect of the present disclosure, the air-conditioning mode switching portion increases the air conditioning capability for the non-specific region as the pressure of the air drawn into the blower becomes higher, in the specific-region prioritizing air conditioning mode.

Furthermore, according to a third aspect of the present disclosure, the air-conditioning mode switching portion adjusts the air conditioning capability for the non-specific region by adjusting at least one of a flow amount of air blown into the non-specific region and a temperature of air blown into the non-specific region.

More specifically, according to a fourth aspect of the present disclosure, the vehicle air conditioner may be provided with a non-specific region side air outlet configured to blow air into the non-specific region. In this case, the air-conditioning mode switching portion adjusts a flow amount of air blown into the non-specific region by adjusting a degree of opening of the non-specific region side air outlet.

According to a fifth aspect of the present disclosure, the air-conditioning mode switching portion may calculate a level of a pressure of the air drawn into the blower based on at least one of (i) a vehicle speed, (ii) an operation state of an inside/outside air switching portion, which adjusts a flow ratio of air inside the vehicle compartment to air outside the vehicle compartment, introduced into the blower, (iii) an operation state of a ram pressure reducing device which reduces a ram pressure during traveling, and (iv) a suction pressure of the blower.

Furthermore, according to a sixth aspect of the present disclosure, the air-conditioning mode switching portion adjusts the air conditioning capability for the non-specific region based on an air conditioning load and the pressure of air drawn into the blower, in the specific-region prioritizing air conditioning mode. Thus, it can suppress the degradation of comfort to the passenger, while saving the power.

According to a seventh aspect of the present disclosure, the air-conditioning mode switching portion calculates the air conditioning load based on at least one of an outside air temperature, a solar radiation amount, a temperature of a vehicle interior, an air-conditioning set temperature, and a surface temperature of a passenger.

For example, according to an eighth aspect of the present disclosure, the specific-region prioritizing air conditioning modes may include a low-load air conditioning mode, and a high-load air conditioning mode having a higher air conditioning capability than that in the low-load air conditioning mode. In this case, the air-conditioning mode switching portion sets the low-load air conditioning mode when the air conditioning load is less than a predetermine load, and the air-conditioning mode switching portion sets the high-load air conditioning mode when the air conditioning load is more than the predetermined load.

Furthermore, according to a ninth aspect of the present disclosure, the air conditioner for a vehicle may be provided with an energy-saving mode setting portion configured to set an energy saving mode for saving the air conditioning capability. Furthermore, the air-conditioning mode switching portion may shift the predetermined load to a higher load side when the energy saving mode is set. Thus, it is possible to save the power by reflecting a passenger's request for reducing the air conditioning capacity.

Furthermore, according to a tenth aspect of the present disclosure, the air-conditioning mode switching portion shifts the predetermined load to the higher load side when an auxiliary air conditioning device is operated. Thus, a comfort to the passenger can be improved by using the auxiliary air conditioning device, while saving the power.

According to an eleventh aspect of the present disclosure, when the air conditioning load is a cooling load and an amount of solar radiation is more than a predetermined solar radiation amount, the air-conditioning mode switching portion shifts the predetermined load to a lower load side in the cooling load.

According to a twelfth aspect of the present disclosure, when the air conditioning load is a heating load and the amount of solar radiation is more than a predetermined solar radiation amount, the air-conditioning mode switching portion shifts the predetermined load to a higher load side in the heating load.

According to a thirteenth aspect of the present disclosure, when risk of fogging of a window is determined to be caused in the specific-region prioritizing air conditioning mode, the air-conditioning mode switching portion may increase the air conditioning capability for the non-specific region, or may switch the specific-region prioritizing air conditioning mode to the normal air conditioning mode. Thus, in a case where risk of fogging is caused, defogging performance of a window in the non-specific region can be improved.

More specifically, according to a fourteenth aspect of the present disclosure, when an operation of a switch is performed by the passenger, or when a degree of the risk of the window fogging is equal to or more than a predetermined level, the air-conditioning mode switching portion determines that the risk of the window fogging is caused.

According to a fifteenth aspect of the present disclosure, the air conditioner for a vehicle may be further provided with an air conditioning operation portion for independently setting air conditioning for the specific region and air conditioning for the non-specific region. Furthermore, when the air conditioning for the non-specific region is set by the air conditioning operation portion in the specific-region prioritizing air conditioning mode, the air-conditioning mode switching portion increases the air conditioning capability for the non-specific region, or switches the specific-region prioritizing air conditioning mode to the normal air conditioning mode. Thus, even in a case where the air conditioning for the specific region is performed, the air conditioning capacity to the non-specific region can be increased in accordance with a passenger's request.

According to a sixteenth aspect of the present disclosure, in the specific-region prioritizing air conditioning mode, the air-conditioning mode switching portion changes at least one of the air conditioning capability for the specific region and the air conditioning capability for the non-specific region over time. Thus, fluctuation air conditioning can be performed in the specific region, thereby further improving comfort to the passenger.

For example, according to a seventeenth aspect of the present disclosure, the air conditioner for a vehicle may further include a specific-region side air outlet for blowing air to the specific region, a non-specific region side air outlet for blowing air to the non-specific region, a defroster air outlet for blowing air to a window, a specific-region side opening and closing door which adjusts a degree of opening of the specific-region side air outlet, a non-specific region side opening and closing door which adjusts a degree of opening of the non-specific region side air outlet, a defroster opening and closing door which adjusts a degree of opening of the defroster air outlet, a specific-region side link mechanism which drives the specific-region side opening and closing door and the defroster opening and closing door in cooperation with each other, and a non-specific region side link mechanism which drives the non-specific region side opening and closing door. In this case, the specific-region side link mechanism is operated in a defroster mode to drive the defroster opening and closing door at a position where the defroster air outlet is open and to drive the specific-region side opening and closing door at a position where the specific-region side air outlet is completely closed, and in a non-defroster mode to drive the specific-region side opening and closing door at a position where the specific-region side air outlet is open. Furthermore, the non-specific region side link mechanism is operated in a defroster mode to drive the non-specific region side opening and closing door at a position where the non-specific region side air outlet is completely closed, and in a non-defroster mode to drive the non-specific region side opening and closing door at a position where the non-specific side air outlet is open. In addition, in the specific-region prioritizing air conditioning mode, the specific-region side link mechanism is set to the non-defroster mode, and the non-specific region side link mechanism is set to the defroster mode.

As described above, the specific-region side link mechanism is set to the non-defroster mode and the non-specific region side link mechanism is set to the defroster mode, so as to set the specific-region prioritizing air conditioning mode. Therefore, the specific-region prioritizing air conditioning can be realized by using the existing link mechanisms.

More specifically, according to an eighth aspect of the present disclosure, the air-conditioning mode switching portion may be configured to switch the normal air conditioning mode at least one of (i) when passengers occupy seats in both the specific region and the non-specific region, and (ii) when a specific-region prioritizing switch for setting the specific region prioritizing air conditioning mode is not pushed. Furthermore, the air-conditioning mode switching portion may be configured to switch the specific-region prioritizing air conditioning mode at least one of (iii) when no passenger occupies a seat in the non-specific region, and (iv) when the specific-region prioritizing switch is pushed.

BRIEF DESCRIPTION OF THE DRAWINGS

The above and other objects, features and advantages of the present disclosure will become more apparent from the following detailed description made with reference to the accompanying drawings. In the drawings:

FIG. 8A is a diagram for explaining an example of the operation of a specific-region prioritizing air conditioning mode in the first embodiment;

FIG. 8B is a diagram for explaining another example of the operation of the specific-region prioritizing air conditioning mode in the first embodiment;

FIG. 8C is a diagram for explaining another example of the operation of the specific-region prioritizing air conditioning mode in the first embodiment;

FIG. 8D is a diagram for explaining another example of the operation of the specific-region prioritizing air conditioning mode in the first embodiment;

FIG. 10A is a diagram explaining an example of a flow amount of air blown into a non-specific region in the first embodiment;

FIG. 10B is a diagram explaining another example of the flow amount of air blown into the non-specific region in the first embodiment;

FIG. 10C is a diagram explaining another example of the flow amount of air blown into the non-specific region in the first embodiment;

FIG. 10D is a diagram explaining another example of the flow amount of air blown into the non-specific region in the first embodiment;

FIG. 10E is a diagram explaining another example of the flow amount of air blown into the non-specific region in the first embodiment;

FIG. 25A is a diagram for explaining an intermediate blowing mode in a modified example of the seventh embodiment;

FIG. 25B is a diagram for explaining another intermediate blowing mode in the modified example of the seventh embodiment;

DETAILED DESCRIPTION

Figure 1:
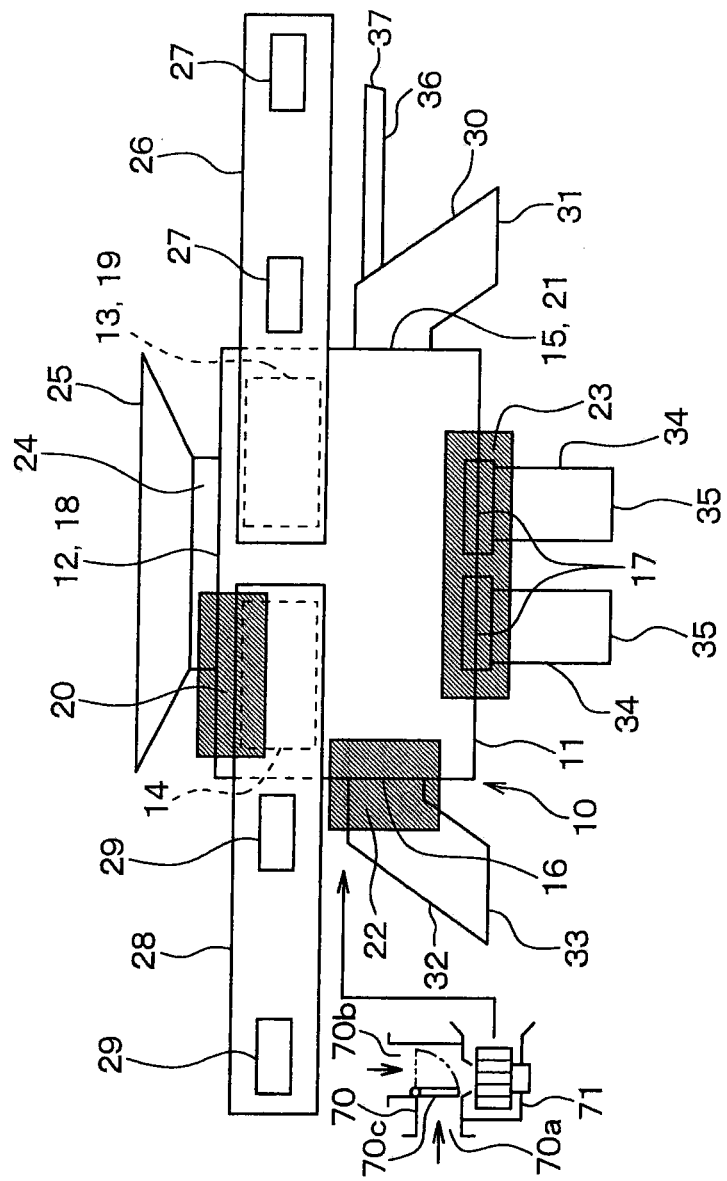
FIG. 1 is a schematic diagram showing an air conditioning unit of an air conditioner for a vehicle in a first embodiment.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Now, a first embodiment of the invention will be described below. An air conditioner for a vehicle in this embodiment includes an air conditioning unit 10 (HVAC) shown in FIG. 1. The air conditioning unit 10 is disposed inside a dashboard 1 at the foremost part of the vehicle compartment shown in FIG. 2, and houses in a casing 11 forming an outer envelope, a blower, an evaporator serving as a heat exchanger for cooling, a heater core serving as a heat exchanger for heating, an air mix door (which are not shown) serving as a temperature controller, and the like.

The casing 11 forms an air passage for blast air blown into the vehicle compartment. The casing 11 is formed of resin having a certain level of elasticity, and excellent strength. The blast air passes through the evaporator and the heater core in the air passage inside the casing 11 to generate conditioned air having a desired temperature.

Air outlet openings 12 to 17 (outlets) are provided on the most downstream side of the blast air flow in the casing 11 to blow out the conditioned air made in the casing 11 into the vehicle compartment serving as a space of interest for the air conditioning. The air outlet openings 12 to 17 are opened and closed by opening and closing doors 18 to 23 (opening and closing mechanisms).

In this example, the air outlet openings 12 to 17 include a defroster opening 12 (defroster air outlet), a driver-seat side face opening 13, a front-passenger-seat side face opening 14, a driver-seat side foot opening 15, a front-passenger-seat side foot opening 16, and a rear-seat side foot opening 17. The opening and closing doors 18 to 20 include a defroster opening and closing door 18 (defroster opening and closing mechanism), a driver-seat side face opening and closing door 19 (driver-seat side face opening and closing mechanism), and a front-passenger-seat side face opening and closing door 20 (front-passenger-seat side face opening and closing mechanism). The opening and closing doors 21 to 23 include a driver-seat side foot opening and closing door 21 (driver-seat side foot opening and closing mechanism), a front-passenger-seat side foot opening and closing door 22 (front-passenger-seat side foot opening and closing mechanism), and a rear-seat side foot opening and closing door 23 (rear-seat side foot opening and closing mechanism).

The opening and closing doors 18 to 23 form a blowing mode switch for switching among the blowing modes. The doors are operated to rotate, for example, by an electric actuator.

The opening and closing doors 18 to 23 may be provided within the casing 11, or outside the casing 11. The opening and closing doors 18 to 23 may have an attachment structure.

The defroster opening 12 is coupled to a resin defroster duct 24, and adapted to blow out the conditioned air from a defroster air outlet 25 at the tip of the defroster duct toward an inner surface of a front windowpane of the vehicle.

The driver-seat side face opening 13 is coupled to a resin driver-seat side face duct 26, and adapted to blow out the conditioned air from a driver-seat side face air outlet 27 at the tip of the driver-seat side face duct toward an upper body of a passenger or driver at a driver seat.

The front-passenger-seat side face opening 14 is coupled to a resin front-passenger-seat side face duct 28, and adapted to blow out the conditioned air from a front-passenger-seat side face air outlet 29 at the tip of the front-passenger-seat side face duct toward an upper body of a passenger at a front passenger seat.

The driver-seat side foot opening 15 is coupled to a resin driver-seat side foot duct 30, and adapted to blow the conditioned air from a driver-seat side foot air outlet 31 at the tip of the driver-seat side foot duct toward the foot of the passenger at the driver seat.

The front-passenger-seat side foot opening 16 is coupled to a resin front-passenger-seat side foot duct 32, and adapted to blow the conditioned air from a front-passenger-seat side foot air outlet 33 at the tip of the front-passenger-seat side foot duct toward the foot of the passenger at the front passenger seat.

The rear-seat side foot opening 17 is coupled to a resin rear-seat side foot duct 34, and adapted to blow the conditioned air from a rear-seat side foot air outlet 35 at the tip of the rear-seat side foot duct toward the foot of the passenger at a rear seat.

A driver-seat side knee duct 36 is branched from the driver-seat side foot duct 30, and adapted to blow the conditioned air from a driver-seat side knee air outlet 37 at the tip of the driver-seat side knee duct toward the knee of the passenger at the driver seat.

The driver-seat side face air outlet 27, the driver-seat side foot air outlet 31, and the driver-seat side knee air outlet 37 are driver-seat side air outlets provided corresponding to the driver seat. The front-passenger-seat side face air outlet 29, the front-passenger-seat side foot air outlet 33, and the rear-seat side foot air outlet 35 are non-driver-seat side air outlets provided corresponding to the seats other than the driver seat (non-driver seats).

The front-passenger-seat side foot air outlet 33 and the rear-seat side foot air outlet 35 can be defined as the non-driver-seat side foot air outlet. Thus, the front-passenger-seat side foot opening and closing door 22 and the rear-seat side foot opening and closing door 23 can be defined as the non-driver-seat side foot opening and closing door (non-driver-seat side foot opening and closing mechanism).

The front-passenger-seat side face duct 28, the front-passenger-seat side foot duct 32, and the rear-seat side foot duct 34 are non-driver-seat side ducts each reaching the corresponding non-driver-seat side air outlet from the air conditioning unit 10.

The blowing modes (air conditioning modes) executed by the opening and closing doors 18 to 23 are classified into a four-seat blowing mode (normal air conditioning mode), and a one-seat concentration mode (specific-region prioritizing air conditioning mode).

The four-seat blowing mode is a blowing mode selected when air conditioning is performed on all regions in a space of the vehicle compartment. The one-seat concentration mode is a blowing mode selected when the air conditioning is preferentially performed on one region including the driver seat (specific region) in the space of the vehicle compartment.

The four-seat blowing modes include a four-seat face mode for blowing the conditioned air from the face air outlets 27 and 29, a four-seat bi-level mode for blowing the conditioned air from the face air outlets 27 and 29 and the foot air outlets 31, 33, and 35, and a four-seat foot mode for blowing the conditioned air from the foot air outlets 31, 33, and 35. In this embodiment, in the four-seat food mode, a small flow amount of the conditioned air is also blown from the face air outlets 27 and 29.

Figure 3A:
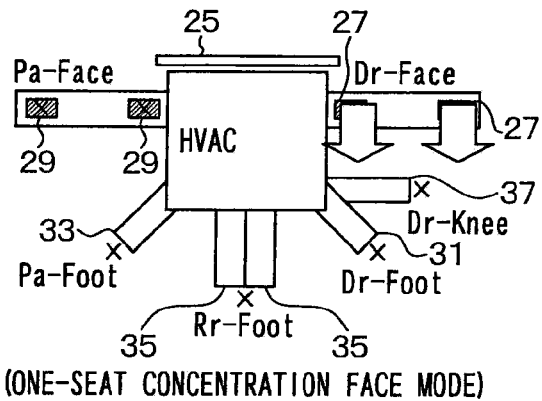
FIG. 3A is a diagram for explaining a one-seat concentration mode in the first embodiment.
Figure 3B:
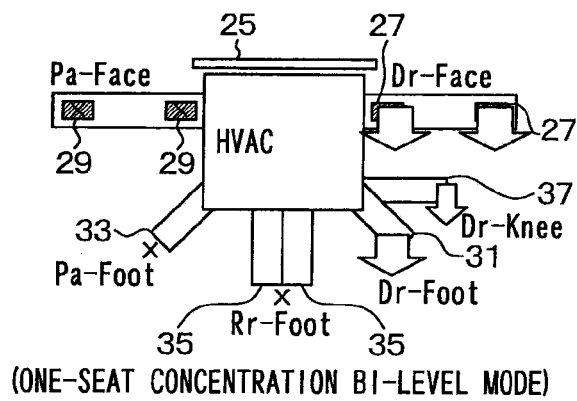
FIG. 3B is a diagram for explaining another one-seat concentration mode in the first embodiment.
Figure 3C:
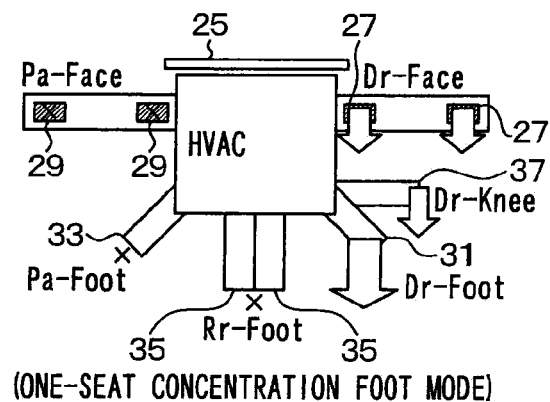
FIG. 3C is a diagram for explaining a further one-seat concentration mode in the first embodiment.

The one-seat concentration modes include a one-seat concentration face mode (see FIG. 3A), a one-seat concentration bi-level mode (see FIG. 3B), and a one-seat concentration foot mode (see FIG. 3C).

The one-seat concentration face mode is a blowing mode for interrupting blowout from the front-passenger-seat side face air outlet 29 as compared to the four-seat face mode, and is performed especially in summer. The one-seat concentration bi-level mode is a blowing mode for interrupting blowout from the front-passenger-seat side face air outlet 29, the front-passenger-seat side foot air outlet 33, and the rear-seat side foot air outlet 35 as compared to the four-seat bi-level mode, and is performed especially in an intermediate season. The one-seat concentration foot mode is a blowing mode for interrupting blowout from the front-passenger-seat side foot air outlet 33 and the rear-seat side foot air outlet 35 as compared to the four-seat foot mode, and is performed especially in winter.

In this embodiment, the driver-seat side knee duct 36 is branched from the driver-seat side foot duct 30. The blowout from the driver-seat side knee air outlet 37 cooperates with the blowout from the driver-seat side foot air outlet 31. That is, when the driver-seat side foot opening and closing door 21 opens the driver-seat side foot opening 15, the conditioned air is blown from the driver-seat side foot air outlet 31 and the driver-seat side knee air outlet 37. When the driver-seat side foot opening and closing door 21 closes the driver-seat side foot opening 15, the blowout of the conditioned air from the driver-seat side foot air outlet 31 and the driver-seat side knee air outlet 37 is interrupted.

As schematically shown in FIG. 1, an inside/outside air switching box 70 is disposed on the most upstream side of the blast air flow in the casing 11 to switch between inside air (air inside the vehicle compartment) and outside air (air outside the vehicle compartment). The inside/outside air switching box 70 is provided with an inside air inlet 70a for introducing the inside air into the casing 11, and an outside air inlet 70b for introducing the outside air thereinto. In the inside/outside air switching box 70, an inside/outside air switching door 70c (inside/outside air switching portion) is provided for changing the ratio of flow amount of the inside air to that of the outside air. The inside/outside air switching door 70c is driven by an electric actuator for the inside/outside air switching door 70c.

Although not shown in FIG. 1, a ram pressure reducing mechanism (ram pressure reducing device) for reducing a ram pressure during traveling at a high speed is provided inside the inside/outside air switching box 70. The ram pressure is a pressure (traveling dynamic pressure) generated by an air flow caused by the traveling vehicle. The ram pressure reducing mechanism can be formed, for example, by providing an outside air inlet door separately from the inside air switching door 70c. The outside air inlet is to reduce the ram pressure by decreasing an opening degree of the outside air inlet 70b during traveling at the high speed. The ram pressure reducing mechanism is not an essential one.

An air blower (blower) 71 for blowing air sucked via the inside/outside air switching box 70 toward the interior of the vehicle is disposed on the downstream side of the air flow in the inside/outside air switching box 70. The blower 71 is a blast machine for generating the air flow in an air passage inside the air conditioning unit 10. The blower 71 is an electric blower which includes a centrifugal multi-blade fan driven by an electric motor. The target number of revolution of the blower 71, that is, the target flow amount of blast air is controlled by a control signal output from the air conditioning controller.

Although not shown in the figure, an evaporator is disposed on the downstream side of the air flow from the blower 71 inside the casing 11. The evaporator is adapted to exchange heat between a refrigerant flowing therethrough and the blast air to thereby cool the blast air. The evaporator forms a refrigeration cycle together with a compressor, a condenser, a vapor-liquid separator, an expansion valve (which are not shown), and the like.

Although not shown, air passages, including a cool air passage for heating and a cool air bypass passage, and a mixing space for mixing the air from the cool air passage for heating with the air from the cool air bypass passage are formed on the downstream side of the air flow of the evaporator.

A heater core (not shown) for heating the cool air having passed through the evaporator is disposed in the cool passage for heating. The heater core exchanges heat between a coolant of an engine that outputs a driving force for the vehicle traveling, and the cool air having passed through the evaporator to thereby heat the air having passed through the evaporator.

The cool air bypass passage is an air passage for guiding the cool air having passed through the evaporator to the mixing space without permitting the cool air to pass through the heater core. Thus, the temperature of the blast air mixed in the mixing space is changed depending on the ratio of flow amount of the air passing through the cool passage for heating to that of the air passing through the cool air bypass passage.

Although not shown in the figure, an air mix door is disposed on the downstream side of the air flow of the evaporator at an entrance of each of the cool passage for heating and the cool air bypass passage. The air mix door adjusts the temperature of air inside the mixing space (temperature of blast air blown into the vehicle compartment) by continuously changing the ratio of flow amount of the cool air flowing into the cool air passage for heating to that of the cool air flowing into the cool air bypass passage.

The air mix door is driven by an electric actuator for the air mix door. The electric actuator has its operation controlled by a control signal output from an air conditioning controller.

In order to blow the blast air whose temperature is adjusted from the mixing space into the vehicle interior of interest for air conditioning, the above-mentioned air outlet openings 12 to 17 are provided on the most downstream side of the flow of the blast air in the casing 11.

Next, an electric controller of this embodiment will be described below based on FIG. 4. An air conditioning controller 40 serving as a controller is comprised of the known microcomputers, including a CPU, a ROM, a RAM, and the like, and its peripheral circuit. The controller 40 performs various types of computations and processes based on an air conditioning control program stored in the ROM. The controller 40 controls the operation of an electric motor for the blower 71 coupled to the output side thereof, and the operation of various types of electric actuators and the like. Thus, the air conditioning controller 40 can be defined as an air conditioner ECU.

The electric actuator controlled by the air conditioning controller 40 includes, for example, a group of electric actuators 41 that are operated to rotate the opening and closing doors 18 to 23. The air conditioning controller 40 controls the electric actuator group 41 to rotate the opening and closing doors 18 to 23 to thereby switch among the blowing modes (air conditioning modes). Thus, the air conditioning controller 40 and the opening and closing doors 18 to 23 can be expressed by the air conditioning mode switch.

The output to the blower 71 among the outputs of the air conditioning controller 40 will be described below. By controlling the supply power to the electric motor 42 for the blower, the target flow amount of blast air from the blower 71 is controlled by the air conditioning controller 40. Specifically, the air conditioning controller 40 controls the number of revolutions of the electric motor 42 by outputting a control signal to a driving circuit (not shown) for driving the electric motor 42, and setting the power from the driving circuit to the electric motor 42.

Figure 5:
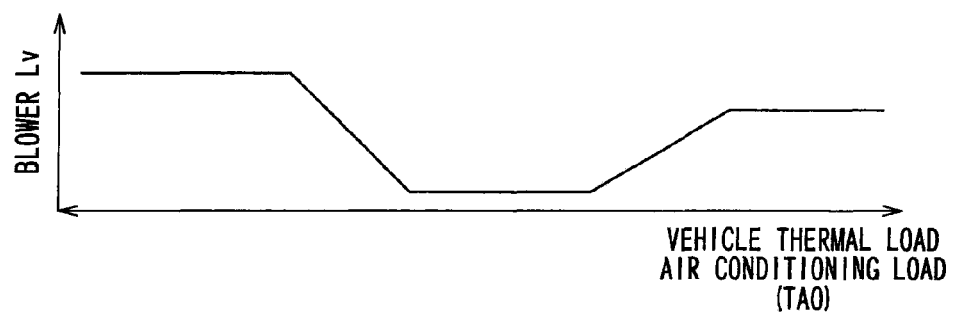
FIG. 5 is a diagram showing a control map used in the first embodiment.

The target flow amount of blast air from the blower 71 is determined using the control map shown in FIG. 5. The lateral axis of FIG. 5 indicates a vehicle thermal load or an air conditioning load. In this example, a TAO (target air outlet temperature) is used as an index indicative of the degree of the vehicle thermal load or air conditioning load (cooling load and heating load). The TAO is calculated from the following formula (1).

$$TAO = A*TSET - B*TR - C*TS - D*TAM + E \qquad (1)$$

wherein A to E are constants for respective vehicles, TSET is an air-conditioning set temperature, TR is the temperature of the vehicle interior, TS is the amount of solar radiation, and TAM is an outside air temperature. Under the high cooling load, the TAO becomes low. Under the high heating load, the TAO becomes high.

The longitudinal axis of FIG. 5 indicates a blower level (blower Lv). The blower level corresponds to the target flow amount of blast air from the blower 71, that is, the target number of revolutions of the electric motor 42. The blower level responds to the supply power to the electric motor. For example, under control of the voltage of the electric motor, the voltage applied to the electric motor by the driving circuit corresponds to the blower level. Under control of the current of the electric motor, the ratio of duty of an ON time to an OFF time of the electric motor corresponds to the blower motor.

The control map shown in FIG. 5 represents a relationship between the blower level and the TAO in the form of the so-called bathtub. That is, in an ultralow temperature region (maximum cooling region) and an ultrahigh temperature region (maximum heating region) of the TAO, the blower level is set to around the maximum value, so that a flow amount of air from the blower 71 is controlled to be near the maximum air amount. When the TAO is increased from the ultralow temperature region toward an intermediate temperature region, the blower level decreases with increasing TAO, so that the flow amount of air from the blower 71 is decreased. Further, when the TAO is decreased from the ultrahigh temperature region toward the intermediate temperature region, the blower level decreases with decreasing TAO, so that the flow amount of air from the blower 71 is decreased. When the TAO is in a predetermined intermediate temperature region, the blower level is set to the minimum value to thereby minimize the flow amount of air from the blower 71.

In the example of FIG. 5, the blower level in the ultrahigh temperature region (maximum heating region) of the TAO is set slightly lower than that in the ultralow temperature region (maximum cooling region) of the TAO. This is because in the maximum cooling region, the conditioned air is blown from the face air outlets 27 and 29 having a relatively large blowout area, whereas in the maximum heating region, the conditioned air is blown from the foot air outlets 31 and 33 having a relatively small blowout area. If the blower level in the maximum heating region is the same as that in the maximum cooling region, noise caused by the blown air in the maximum heating region becomes larger to make the passenger feel uncomfortable.

Figure 4:
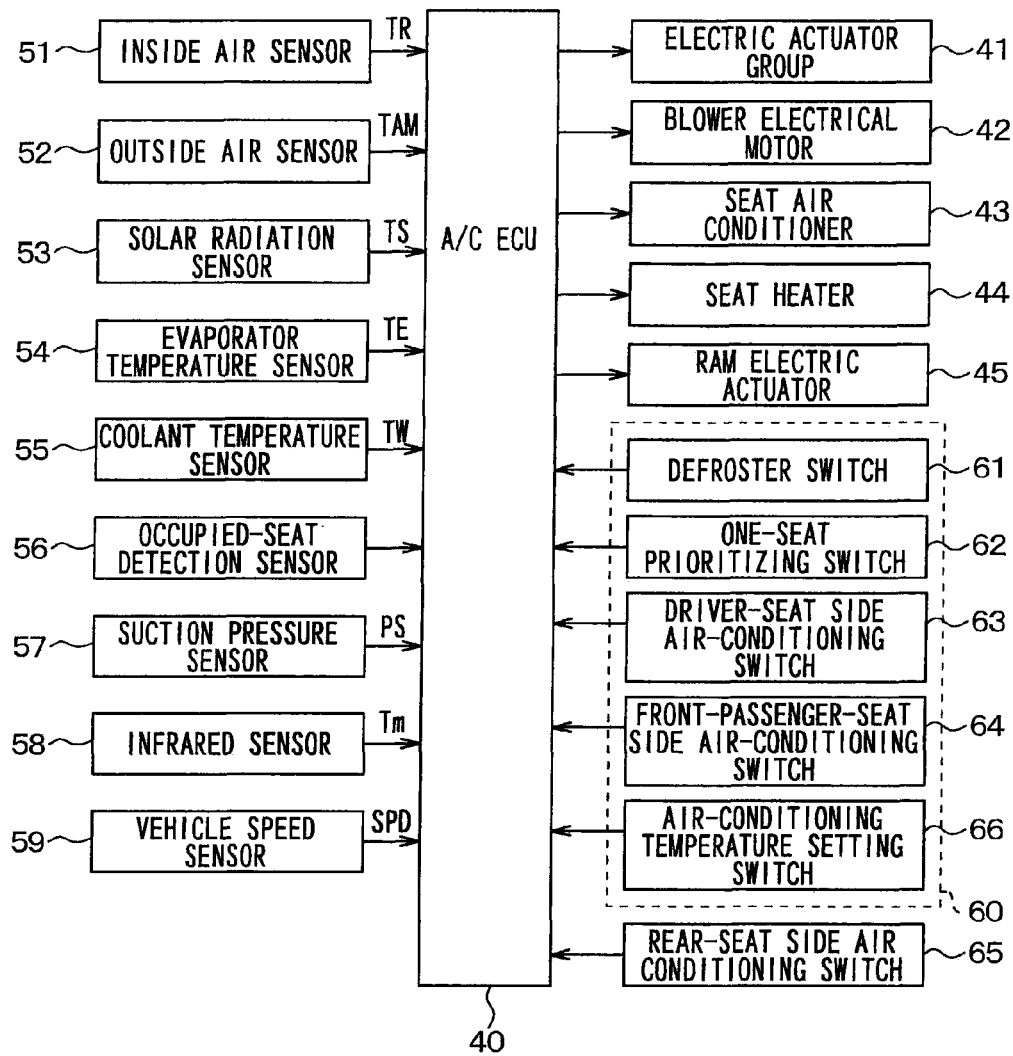
FIG. 4 is a block diagram showing an electric controller in the first embodiment.

As shown in FIG. 4, the output of the air conditioning controller 40 is coupled to a seat air conditioner 43 (seat blower) and a seat heater 44 which serve as an auxiliary air conditioning device. The seat air conditioner 43 is disposed at the driver seat to blow the conditioned air to the passenger at the driver seat. The seat heater 44 is disposed at the driver seat to warm the passenger at the driver seat. The output of the air conditioner 40 is coupled to an electric actuator 45 of the ram pressure reducing mechanism.

Detection signals from a group of sensors are input to the input side of the air conditioning controller 40. The sensors include an inside air sensor 51 serving as vehicle interior temperature detection means for detecting a temperature TR of the vehicle interior, an outside air sensor 52 serving as outside air temperature detection means for detecting an outside air temperature TAM, and a solar radiation sensor 53 serving as solar radiation detection means for detecting an amount of solar radiation TS in the vehicle compartment. And, the sensors also include an evaporator temperature sensor 54 serving as cool air temperature detection means for detecting an evaporator blown air temperature (cool air temperature) TE of the air from the evaporator, and a coolant temperature sensor 55 serving as coolant temperature detection means for detecting an engine coolant temperature TW.

A detection signal from a sensor 56 for detecting an occupied seat (occupied seat detector) is input to the input side of the air conditioning controller 40. The occupied seat detecting sensor 56 detects the presence or absence of the passenger at each of the front passenger seat and rear seats. The occupied seat detecting sensor 56 for use can be a seating sensor, a seatbelt sensor, an infrared sensor, or the like.

Detection signals from other sensors are also input to the input side of the air conditioning controller 40. The sensors include a suction pressure sensor 57 (suction pressure detector) for detecting a suction pressure Ps of the blower 71, an infrared sensor 58 (surface temperature detector) for detecting a surface temperature Tm of the passenger, and a vehicle speed sensor 59 (vehicle speed detector) for detecting a vehicle speed SPD. The infrared sensor 58 detects a temperature of the skin of the passenger, a temperature of passenger's clothes, and the like.

Operation signals are input to the input side of the air conditioning controller 40 from various air conditioning operation switches provided in an air conditioning operation panel 60 disposed on the dashboard 1 at the foremost part of the vehicle compartment. Specifically, various air conditioning operation switches provided in the air conditioning operation panel 60 include an operation switch for the air conditioner for a vehicle, an air conditioner switch for switching between on and off of the air conditioner, an automatic switch for setting and resetting automatic control of the air conditioner for the vehicle, a selector switch between operating modes, an inside/outside air selector switch for switching the introduction between inside air and outside air, a blowing mode switch for switching among blowing modes, an air-blowing amount setting switch (air flow amount setting switch) for setting the flow amount of air from the blower 71, an air-conditioning temperature setting switch 66 for setting an air conditioning temperature TSET, and a defroster switch 61 for setting a defroster mode. The defroster mode is a blowing mode for blowing the conditioned air from the defroster air outlet 25 toward the inner surface of the front windowpane of the vehicle so as to prevent the fogging of the windowpane.

Figure 2:
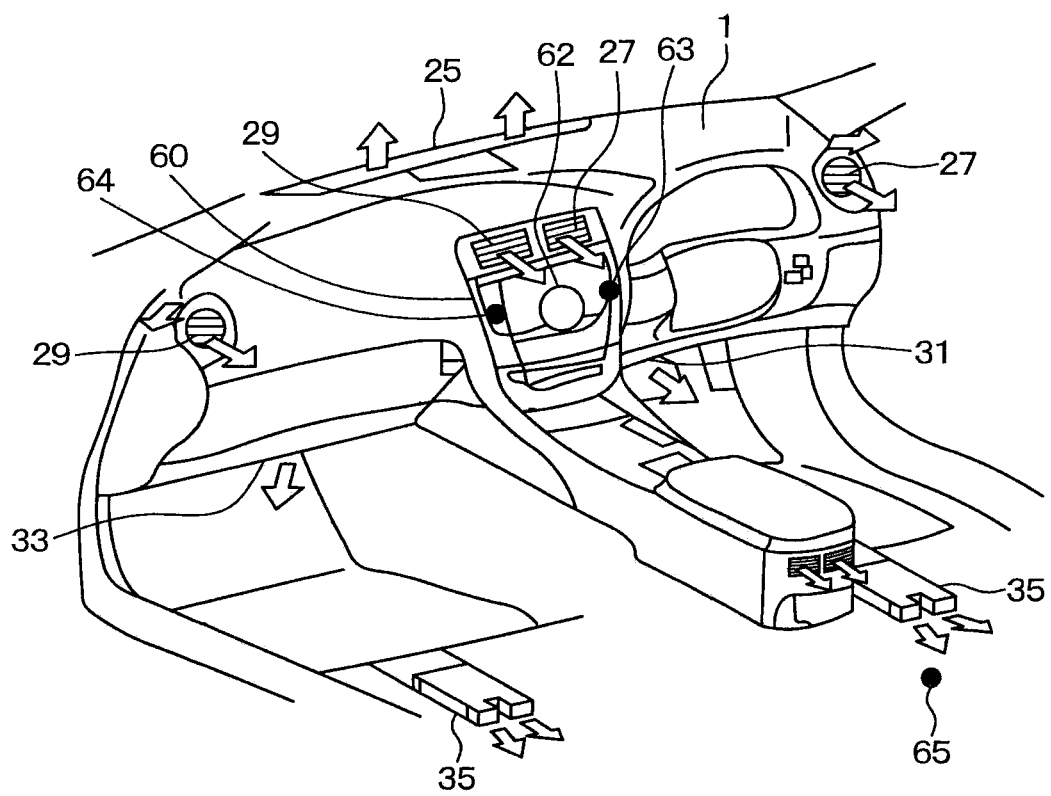
FIG. 2 is a perspective view showing a foremost part of a vehicle compartment of the vehicle to which the first embodiment is applied.

The air conditioning operation panel 60 is provided with a one-seat prioritizing switch 62 (specific-region prioritizing switch) for setting the one-seat concentration mode and the intermediate blowing mode, a driver-seat side air-conditioning switch 63 for setting the state of air conditioning (temperature of air conditioning, and the like) on the driver-seat side, and a front-passenger-seat side air-conditioning switch 64 (non-driver-seat side air conditioning operation portion) for setting the state of air conditioning (temperature of air conditioning, and the like) on the front-passenger-seat side. FIG. 2 shows an example of arrangement of the one-seat prioritizing switch 62, the driver-seat side air-conditioning switch 63, and the front-passenger-seat side air-conditioning switch 64 at the dashboard 1.

An operation signal is also input from a rear-seat side air conditioning switch 65 (non-driver-seat side air conditioning operation portion) to the input side of the air conditioning controller 40. The rear-seat side air conditioning switch 65 is a switch for setting the state of air conditioning (temperature of air conditioning and the like) on the rear-seat side, and is disposed, for example, at an armrest on the rear seat in the vehicle compartment. FIG. 2 schematically shows the rear-seat side air conditioning switch 65.

The driver-seat side air-conditioning switch 63, the front-passenger-seat side air-conditioning switch 64, and the rear-seat side air conditioning switch 65 can independently set the air conditioning (temperature of air conditioning, and the like) in the respective driver-seat side region, front-passenger-seat side region, and rear-seat side region in the vehicle compartment.

The setting of air conditioning on the rear-seat side can be performed by the switch provided in the air conditioning operation panel 60.

Figure 6:
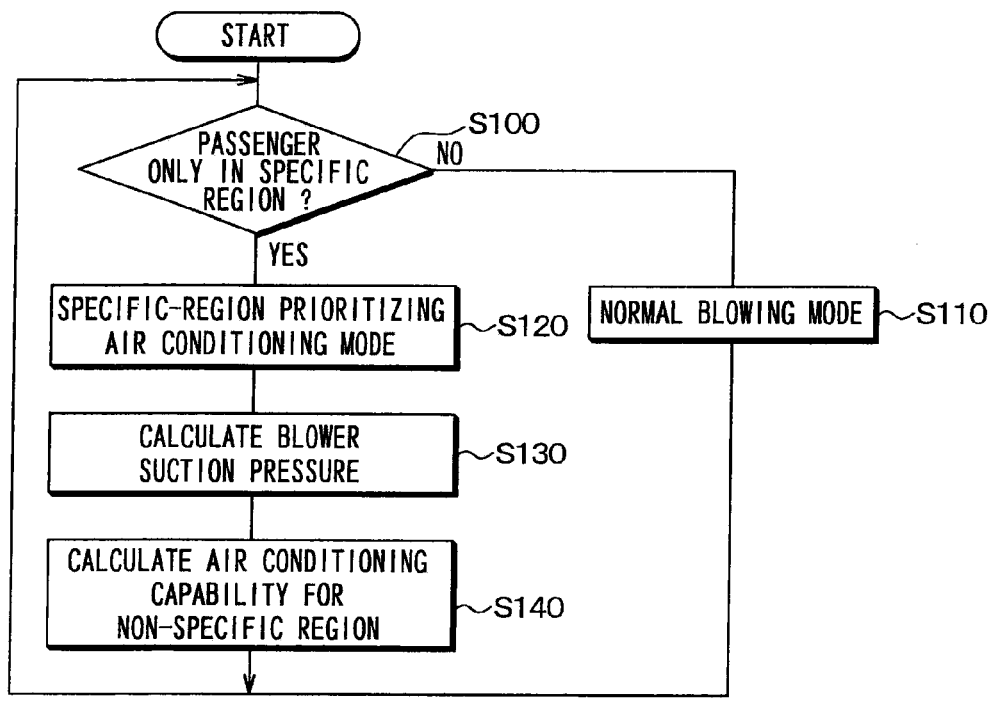
FIG. 6 is a flowchart showing a part of a control process performed in the first embodiment.

FIG. 6 shows a flowchart of a part of a control process performed by the air conditioning controller 40. The air conditioning controller 40 starts operating the specific region prioritizing air conditioning mode. As such, the air conditioning controller first determines whether or not the passenger occupies a seat only in a specific region in step S100. The determination is performed based on a detection signal from the occupied seat detecting sensor 56.

In this embodiment, the driver-seat side region in the space of the vehicle compartment is defined as the specific region, and the front-passenger-seat side region and the rear-seat side region other than the driver-seat side region are defined as a non-specific region.

Thus, the driver-seat side face opening 13 and the driver-seat side foot opening 15 can be defined as the specific region side air outlet, whereas the driver-seat side face opening and closing door 19 and the driver-seat side foot opening and closing door 21 can be defined as the specific region side opening and closing door.

The front-passenger-seat side face opening 14, the front-passenger-seat side foot opening 16, and the rear-seat side foot opening 17 can be defined as the non-specific region side air outlet, whereas the front-passenger-seat side face opening and closing door 20, the front-passenger-seat side foot opening and closing door 22, and the rear-seat side foot opening and closing door 23 can be defined as the non-specific region side opening and closing door.

When the passenger is determined to occupy the seat in a region other than the specific region (that is, non-specific region) (if NO), the operation proceeds to step S110, in which the normal blowing mode (four-seat blowing mode) is determined.

As mentioned above, the normal blowing modes (four-seat blowing modes) include a four-seat face mode, a four-seat bi-level mode, a four-seat foot mode, and the like. Thus, the conditioned air is blown into both the specific region and the non-specific region.

Figure 7A:
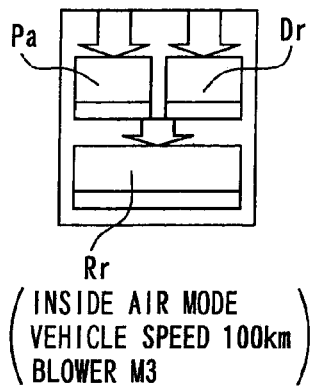
FIG. 7A is a diagram for explaining an example of the operation of a normal blowing mode in the first embodiment.
Figure 7B:
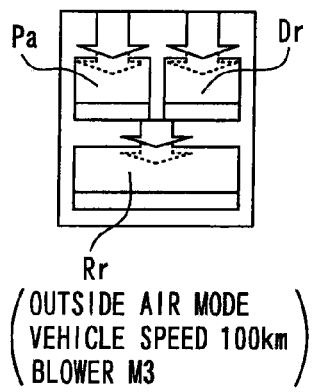
FIG. 7B is a diagram for explaining another example of the operation of the normal blowing mode in the first embodiment.
Figure 7C:
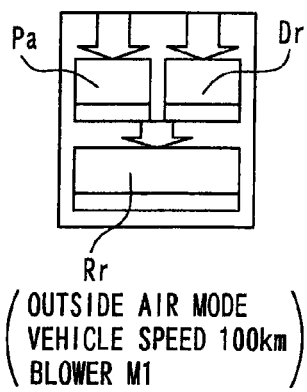
FIG. 7C is a diagram for explaining another example of the operation of the normal blowing mode in the first embodiment.

FIGS. 7A to 7C are diagrams for explaining operation examples of the normal blowing modes, while showing the case where a vehicle speed is high (for example, 100 km per hour). FIGS. 7A to 7C are plan views of the spaces inside the vehicle compartment. The flow amounts of conditioned air blown into the driver-seat side region Dr, the front-passenger-seat side region Pa, and the rear-seat side region Rr are schematically represented by the length of each arrow.

Upon switching from the inside air introduction mode shown in FIG. 7A to the outside air introduction mode shown in FIG. 7B, as schematically shown by a dashed arrow of FIG. 7B, the flow amount of conditioned air blown into the specific region and the non-specific region will be increased by the influence of the ram pressure.

In order to set and keep the flow amount of the conditioned air blown into the specific region and the non-specific region in the outside air introduction mode to the same level as that in the inside air introduction mode, the blower level is decreased as shown in FIG. 7C. In the example shown in FIG. 7C, the blower level is decreased from M3 to M1.

When the passenger is determined to occupy the seat only in the specific region in step S100 (If YES), the operation proceeds to step S120, in which the specific-region prioritizing air conditioning mode (one-seat concentration mode) is determined.

As mentioned above, the specific-region prioritizing air conditioning modes (one-seat concentration modes) include the one-seat concentration face mode, the one-seat concentration bi-level mode, and the one-seat concentration foot mode. Thus, the conditioned air is blown and concentrated on the specific region as compared to the normal blowing mode (four-seat blowing mode), and thus the blowout of the conditioned air into the non-specific region is suppressed.

FIGS. 8A to 8D are diagrams for explaining operation examples of the specific-region prioritizing air conditioning modes, showing the case where a vehicle speed is high (for example, 100 km per hour). FIGS. 8A to 8D are plan views of the spaces inside the vehicle compartment. The flow amounts of conditioned air blown into the driver-seat side region Dr, the front-passenger-seat side region Pa, and the rear-seat side region Rr are schematically represented by the length of each arrow.

Upon switching from the inside air introduction mode shown in FIG. 8A to the outside air introduction mode shown in FIG. 8B, as schematically shown by a dashed arrow of FIG. 8B, the flow amount of the conditioned air blown into the specific region and the non-specific region will be increased by the influence of the ram pressure. In order to decrease the flow amount of the conditioned air blown into the specific region, the blower level is decreased as shown in FIG. 8C. In the example shown in FIG. 8C, the blower level is decreased from M3 to Lo.

In the specific-region prioritizing air conditioning mode, the conditioned air is blown and concentrated onto the specific region. Even if the blower level is decreased, the flow amount of conditioned air blown into the specific region in the prioritizing mode often becomes more than that in the inside air introduction mode.

In steps S130 and S140, control process is performed for keeping the flow amount of conditioned air blown into the specific region in the prioritizing mode to the same level as that in the inside air introduction mode.

In step S130, a blower suction pressure (in other words, a pressure of air drawn (pushed) into the blower 71) is calculated. In this embodiment, a ram pressure is calculated based on the operating state of the inside/outside air switching door 70c and the vehicle speed SPD, and then the calculated ram pressure is used as the blower suction pressure. The more the ratio of the outside air to the introduced air, the higher the ram pressure. The higher the vehicle speed SPD, the higher the ram pressure.

The blower suction pressure may be calculated based on at least one of the vehicle speed SPD, the operating state of the inside/outside switching door 70c, the operating state of the ram pressure reducing mechanism, and the suction pressure Ps. As mentioned above, the suction pressure Ps can be detected by the suction pressure sensor 57.

In the subsequent step S140, an air conditioning capability for the non-specific region is calculated. Specifically, the air conditioning capability for the non-specific region is calculated based on the blower suction pressure calculated in step S130, with reference to the control map previously stored in the air conditioning controller 40.

Figure 9:
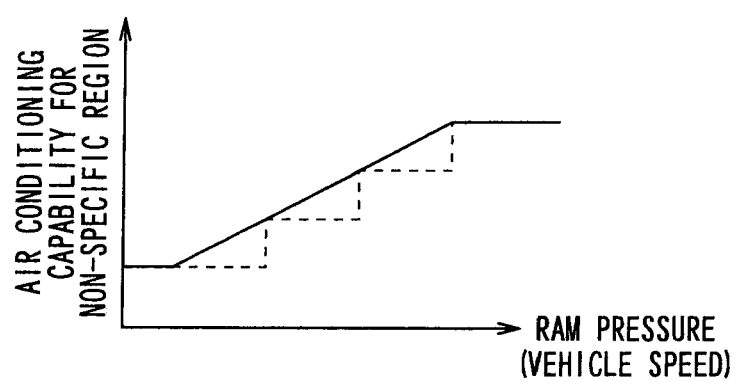
FIG. 9 is a diagram showing a control map used in the first embodiment.

FIG. 9 shows an example of the control map referred to in step S140. As the ram pressure becomes higher, the air conditioning capability for the non-specific region is increased. As indicated by the solid line, as the ram pressure becomes higher, the air conditioning capability for the non-specific region may be continuously increased. Alternatively, as indicated by the broken line, as the ram pressure becomes higher, the air conditioning capability for the non-specific region may be stepwisely increased. In the map shown in FIG. 9, the vehicle speed SPD may be used instead of the ram pressure.

The flow amount of conditioned air blown into the non-specific region is adjusted according to the air conditioning capability for the non-specific region calculated in step S140. Specifically, as the air conditioning capability for the non-specific region calculated in step S140 becomes more, the flow amount of air blown into the non-specific region is increased by increasing an opening degree of at least one of the front-passenger-seat side air outlets 29 and 33, and the rear-seat side air outlet 35. The increase in flow amount of the air blown into the non-specific region decreases the flow amount of the air blown into the specific region, so that the flow amount of the conditioned air blown into the specific region is kept at the same level as that in the inside air introduction mode.

FIGS. 10A to 10E show examples of the flow amounts of air blown into the non-specific regions. FIGS. 10A to 10E each represent the flow amount of air by the area indicated by the area of the arrow. As shown in FIGS. 10A to 10E, the flow amount of conditioned air blown into the specific region (driver-seat side region Dr) is kept at the same level as that in the inside air introduction mode by adjusting the flow amount of air blown into the non-specific regions (front-passenger-seat side region Pa and rear-seat side region Rr) according to the blower suction pressure (pressure of air drawn into the blower 71). When the flow amount of air blown into the non-specific region needs to be more than that in the state shown in FIG. 10A, this mode may be switched to the normal air conditioning mode (four-seat blowing mode).

This embodiment can change the degree of concentration of the air conditioning capability on the passenger in the specific region according to the blower suction pressure (pressure of air drawn into the blower 71). Specifically, as the blower suction pressure (pressure of air drawn into the blower 71) becomes higher, the air conditioning capability for the non-specific region can be increased. Thus, the degradation of comfort to the passenger can be suppressed while saving the power.

Although in the above embodiment the driver-seat side region is defined as the specific region, and the front-passenger-seat side region and the rear-seat side region are defined as the non-specific region, the driver-seat side region and the front-passenger-seat side region may be defined as the specific region, and the rear-seat side region may be defined as the non-specific region in a modified example.

In the modified example, the driver-seat side face opening 13, the driver-seat side foot opening 15, the front-passenger-seat side face opening 14, and the front-passenger-seat side foot opening 16 can be represented as a specific-region side air outlet, and the driver-seat side face opening and closing door 19, the driver-seat side foot opening and closing door 21, the front-passenger-seat side face opening and closing door 20, and the front-passenger-seat side foot opening and closing door 22 can be represented as the specific-region side opening and closing door. The rear-seat side foot opening 17 can be represented as the non-specific region side air outlet, and the rear-seat side foot opening and closing door 23 can be represented as the non-specific region side opening and closing door.

Figures 11A, 11B:
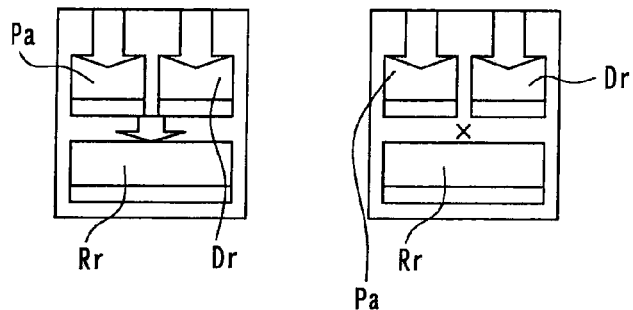
FIG. 11A is a diagram explaining an example of the flow amount of air blown into the non-specific region in a modified example of the first embodiment.
FIG. 11B is a diagram explaining another example of the flow amount of air blown into the non-specific region in the modified example of the first embodiment.

FIGS. 11A and 11B show examples of specific blowout patterns in the normal blowing mode and in the specific-region prioritizing air conditioning mode in the modified example.

As shown in FIGS. 11A and 11B, the flow amount of conditioned air blown into the specific region (driver-seat side region and front-passenger-seat side region) is kept at the same level as that in the inside air introduction mode by adjusting the flow amount of air blown into the non-specific region (rear-seat side region) according to the blower suction pressure (pressure of air drawn into the blower 71). When the flow amount of air blown into the non-specific region needs to be more than that in the state shown in FIG. 11A, this mode may be switched to the normal air conditioning mode (four-seat blowing mode).

Second Embodiment

Although in the above first embodiment, the air conditioning capability for the non-specific region is determined according to the blower suction pressure, in a second embodiment, an air conditioning capability for the non-specific region is determined according to the blower suction pressure, and a vehicle thermal load or air conditioning load.

The vehicle thermal load or air conditioning load is a value calculated from an outside air temperature Tam, a solar radiation amount Ts, a vehicle interior temperature Tr, an air-conditioning set temperature TSET, a surface temperature Tm of the passenger, and the like. For example, the target air outlet temperature TAO can be used as the vehicle thermal load or air conditioning load.

At the time of a low load, for example, in an intermediate season, at the time with a little solar radiation in summer, or at the time with enough solar radiation in winter, the air conditioning capability for the non-specific region is decreased, which can reduce the air conditioning capability without degrading the comfort to the passenger.

From the time of an intermediate load to the time of a high load, for example, at the time with high solar radiation at a high outside air temperature in summer, or at the time with little solar radiation at a low outside air temperature in winter, the air conditioning is not performed on the non-specific regions, which can degrade the thermal comfort to the passenger in the specific region.

Accordingly, this embodiment increases the air conditioning capability in the non-specific region from the intermediate load time to the high load time, and thereby can keep the thermal comfort to the passenger in the specific region.

Figure 12:
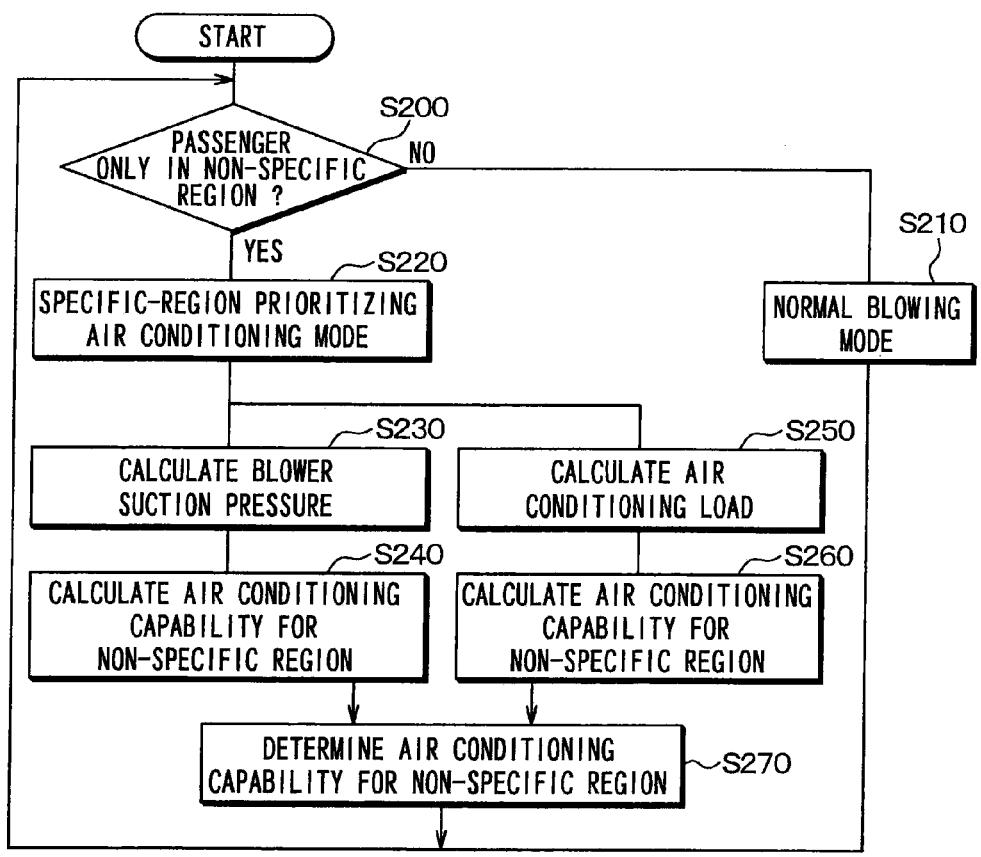
FIG. 12 is a flowchart showing a part of a control process performed in a second embodiment.

FIG. 12 shows a flowchart showing a part of a control process performed by the air conditioning controller 40 in this embodiment. In step S200, first, it is determined whether or not the passenger occupies the seat only in the specific region. The determination is made based on a detection signal from the occupied seat detecting sensor 56.

In this embodiment, the driver-seat side region is defined as the specific region, and the front-passenger-seat side region and the rear-seat side region are defined as the non-specific region.

When the passenger is determined to occupy the seat in a region other than the specific region (if NO), the operation proceeds to step S210, in which the normal blowing mode is determined. The normal blowing mode is performed in the same way as that in the above first embodiment.

When the passenger is determined to occupy the seat only in the specific region in step S200 (If YES), the operation proceeds to step S220, in which the specific-region prioritizing air conditioning mode is determined.

In the subsequent steps S230 to S270, the control process is performed to keep the flow amount of conditioned air blown into the specific region at the same level as that in the inside air introduction mode.

In step S230, a blower suction pressure is calculated. A method for calculating a blower suction pressure is the same as that performed in step S130 of the above first embodiment.

In the subsequent step S240, an air conditioning capability for the non-specific region is calculated based on the calculated blower suction pressure. Specifically, the air conditioning capability for the non-specific region is calculated based on the blower suction pressure calculated in step S230 with reference to a control map previously stored in the air conditioning controller 40. This embodiment uses the same control map as that described above with reference to FIG. 9.

In contrast, in step S250, a TAO (target air outlet temperature) is calculated by the above mathematical formula (1) as an index indicative of the degree of an air conditioning load.

In the subsequent step S260, an air conditioning capability for the non-specific region is calculated based on the calculated air conditioning load. Specifically, the air conditioning capability for the non-specific region is calculated based on the air conditioning load (TAO) calculated in step S250 with reference to the control map previously stored in the air conditioning controller 40.

Figure 13:
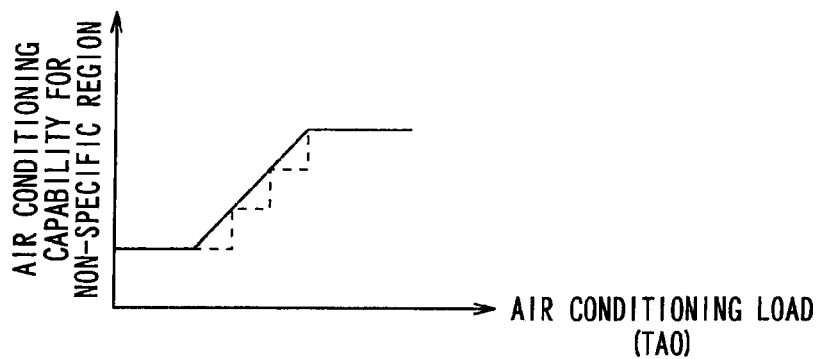
FIG. 13 is a diagram showing a control map used in the second embodiment.

FIG. 13 shows an example of the control map referred to in step S260. As the air conditioning load (TAO) becomes higher, the air conditioning capability for the non-specific region is increased. As indicated by the solid line, as the air conditioning load (TAO) becomes larger, the air conditioning capability for the non-specific region may be continuously increased. Alternatively, as indicated by the dashed line, as the air conditioning load (TAO) becomes larger, the air conditioning capability for the non-specific region may be stepwisely increased.

Then, in step S270, the air conditioning capability for the non-specific region calculated based on the ram pressure in step S240 is compared with that for the non-specific region calculated based on the air conditioning load in step S260. A larger one of these air conditioning capabilities is employed.

In this embodiment, the air conditioning capability for the non-specific region is determined based on the vehicle thermal load or air conditioning load in the specific-region prioritizing air conditioning mode (one-seat concentration mode), which can sufficiently ensure the comfort to the passenger well.

The air conditioning capability for the specific region in the specific-region prioritizing air conditioning mode (one-seat concentration mode) is set to the same level as that for the specific region in the normal blowing mode (four-seat blowing mode), whereby the air conditioning capabilities for the unnecessary non-specific regions are reduced to enable the effective air conditioning.

In the above step S260, as the air conditioning load (TAO) becomes larger, the air conditioning for the non-specific region is increased. In the modified example of this embodiment, when the air conditioning load is less than a predetermined load, a low load air conditioning mode may be set, and when the air conditioning load is more than the predetermined load, a high load air conditioning mode having the air conditioning capability higher than that in the low load air conditioning mode may be set.

Figure 14:
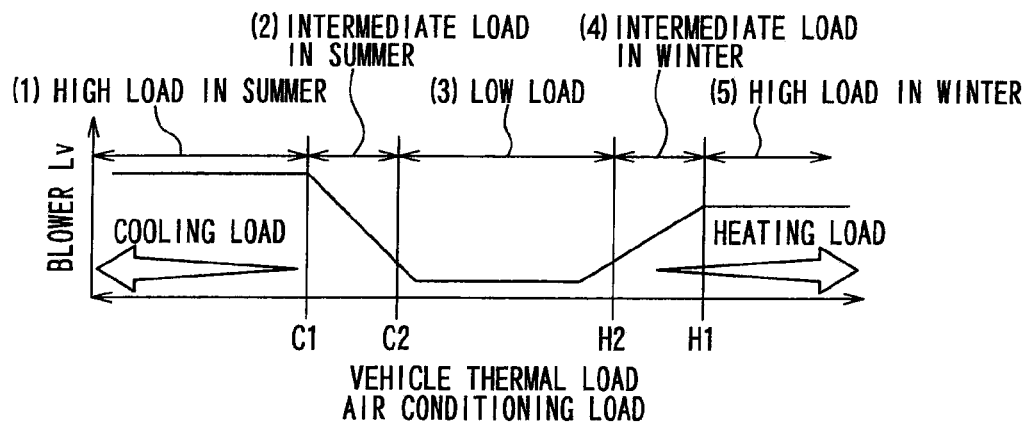
FIG. 14 is a diagram showing a control map used in a modified example of the second embodiment.

Now, the modified example will be described below. First, it is determined whether or not the TAO is in any one of the regions (1) to (5) shown in FIG. 14. Specifically, when the TAO is equal to or lower than a low-temperature side predetermined load C1, the TAO is determined to be in the region (1). When the TAO is more than the low-temperature side predetermined load C1 and less than a low-temperature side predetermined load C2, the TAO is determined to be in the region (2). When the TAO is equal to or more than the low-temperature side predetermined load C2, and equal to or less than a high-temperature side predetermined load H2, the TAO is determined to be in the region (3). When the TAO is more than the high-temperature side predetermined load H2, and less than the high-temperature side predetermined load H1, the TAO is determined to be in the region (4). When the TAO is equal to or more than the high-temperature side predetermined load H1, the TAO is determined to be in the region (5).

In the modified example, the low-temperature side predetermined loads C1 and C2 and the high-temperature side predetermined loads H1 and H2 are fixed values previously stored in the air conditioning controller 40. As shown in FIG. 13, the regions (1) to (5) in this embodiment can be defined as a high load in summer, an intermediate load in summer, a low load, an intermediate load in winter, and a high load in winter in that order.

Figure 15A:
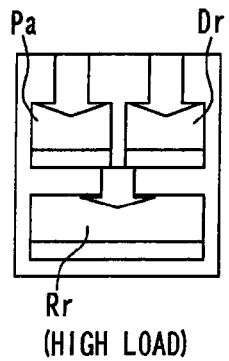
FIG. 15A is a diagram explaining an example of a flow amount of air blown into a non-specific region in the modified example of the second embodiment.
Figure 15B:
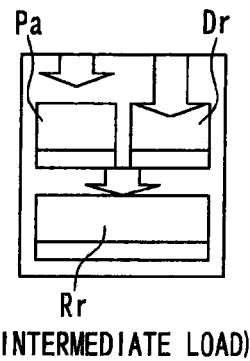
FIG. 15B is a diagram explaining another example of the flow amount of air blown into the non-specific region in the modified example of the second embodiment.
Figure 15C:
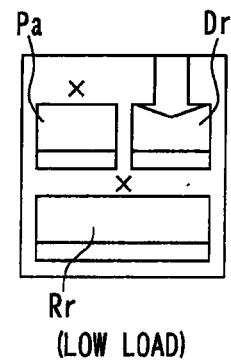
FIG. 15C is a diagram explaining another example of the flow amount of air blown into the non-specific region in the modified example of the second embodiment.

For the TAO under the high load in the region (1) or (5), as shown in FIG. 15A, the air conditioning capability for the non-specific regions is determined to be at the same level as that in the normal blowing mode. For the TAO under the intermediate load in the region (2) or (4), as shown in FIG. 15B, the air conditioning capability for the non-specific region is determined to be lower than that under the high load. For the TAO under the low load in the region (3), as shown in FIG. 15C, the air conditioning capability for the non-specific region is determined to be lower than that under the intermediate load.

In the modified example, the low-temperature side predetermined loads C1 and C2 and the high-temperature side predetermined loads H1 and H2 are fixed values previously stored in the air conditioning controller 40. Alternatively, at least one of the low-temperature side predetermined loads C1 and C2 and the high-temperature side predetermined loads H1 and H2 may be changed according to various conditions.

For example, when an energy saving mode is selected, the low-temperature side predetermined loads C1 and C2 and the high-temperature side predetermined loads H1 and H2 may be respectively shifted to a higher load side. Specifically, upon selecting the energy saving mode, the low-temperature side predetermined loads C1 and C2 are shifted to a lower temperature side, and the high-temperature side predetermined loads H1 and H2 are shifted to a higher temperature side, whereby the air conditioning capability can be decreased to provide the effect of energy saving.

In this example, the energy saving mode is set by the passenger's operation of a one-seat prioritizing switch 62. As shown in FIGS. 15A to 15C, the one-seat prioritizing switch 62 can select a comfortable mode (comfort) and an energy saving mode (eco), in addition to the one-seat prioritizing mode. Thus, the one-seat prioritizing switch 62 can be defined as an energy-saving mode setting portion.

When auxiliary air conditioning devices, including a seat air conditioner 43, a seat heater 44, a radiation heater, and the like are operated, the low-temperature side predetermined loads C1 and C2 and the high-temperature side predetermined loads H1 and H2 may be shifted to the higher load side.

Alternatively, the low-temperature side predetermined loads C1 and C2 and the high-temperature side predetermined loads H1 and H2 may be changed according to the solar radiation amount TS. Specifically, during a cooling operation, as the solar radiation amount TS becomes more, the low-temperature side predetermined loads C1 and C2 and the high-temperature side predetermined loads H1 and H2 are shifted to the lower load side, which can improve the comfort to the passenger. In contrast, during a heating operation, as the solar radiation amount TS becomes larger, the low-temperature side predetermined loads C1 and C2 and the high-temperature side predetermined loads H1 and H2 are shifted to the higher load side, which suppresses the excessive heating capability, and thus can achieve both the comfort to the passenger and the power saving.

The air conditioning capability for the non-specific region may be changed according to the position of the seat of interest. For example, when the position of the front passenger seat is located at the rearmost end and a backrest at the front passenger seat is reclined, the passenger at the front passenger seat is substantially in the same state as at the rear seat. Thus, the air conditioning capability in the rear seat region is preferably increased so as not to degrade the comfort to the passenger at the front passenger seat. Alternatively, the air conditioning capability to the non-specific region may be changed according to the wind direction.

Third Embodiment

Although in the above second embodiment, the air conditioning capability for the non-specific region is determined according to the blower suction pressure, and the vehicle thermal load or air conditioning load, in a third embodiment, the air conditioning capability for the non-specific region is increased when fogging of a window is supposed to be caused.

Figure 17:
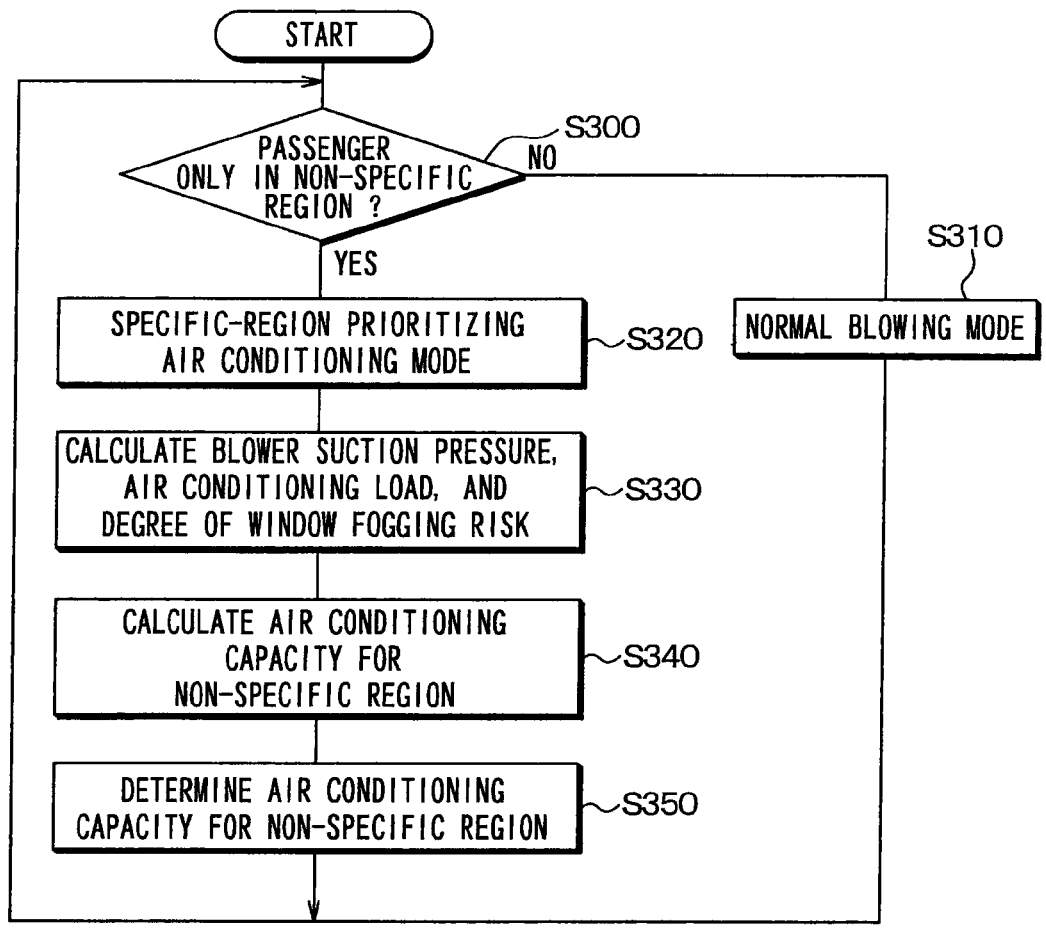
FIG. 17 is a flowchart showing a part of a control process performed in a third embodiment.

FIG. 17 is a flowchart showing a part of a control process performed by the air conditioning controller 40. The air conditioning controller 40 determines whether or not the passenger occupies the seat only in the specific region in step S300. The determination is made based on a detection signal from the occupied seat detecting sensor 56.

In this example, the driver-seat side region is defined as the specific region, and the front-passenger-seat side region and the rear-seat side region are defined as the non-specific region.

When the passenger is determined to occupy the seat in a region other than the specific region (if NO), the operation proceeds to step S310, in which the normal blowing mode is determined. The operation of the normal blowing mode is performed in the same way as the above first and second embodiments.

When the passenger is determined to occupy the seat only in the specific region in step S300 (if YES), the operation proceeds to step S320, in which the specific-region prioritizing air conditioning mode is determined. In the subsequent steps S330 to S350, the control process is performed for keeping the flow amount of conditioned air blown into the specific region at the same level as that in the inside air introduction mode, while preventing the fogging of the window.

In step S330, a blower suction pressure, an air conditioning load, and a degree of risk of window fogging are calculated. The calculation method of the blower suction pressure and the air conditioning load is the same as that in steps S230 and S250 of the above second embodiment.

In this embodiment, the degree of risk of the window fogging is calculated based on the outside air temperature Tam, the engine coolant temperature TW, the solar radiation amount TS of the vehicle interior, the vehicle speed SPD, the number of passengers, and the like. For example, the degree of risk of the window fogging is determined to be high at the high outside air temperature Tam, at the low engine coolant temperature TW, at the high vehicle speed SPD, or at the time when the number of passengers is large. The degree of risk of the window fogging may be calculated based on a detection value from a glass humidity sensor, the presence or absence of the passenger's operation of a switch (for example, the presence or absence of the operation of the defroster switch) or the like.

The degree of risk of the window fogging may be calculated based on at least one of the outside air temperature Tam, the engine coolant temperature TW, the solar radiation amount TS of the vehicle interior, the vehicle speed SPD, the number of the passengers, the detection value from the glass humidity sensor, and the presence or absence of the passenger's operation of the switch.

In step S340, an air conditioning capability for the non-specific region is calculated. Specifically, the air conditioning capability for the non-specific region is calculated based on the blower suction pressure, and the air conditioning capability for the non-specific region is also calculated based on the air conditioning load.

The calculation method of the air conditioning capability for the non-specific region based on the blower suction pressure, and the calculation method of the air conditioning capability for the non-specific region based on the air conditioning load are performed in the same manner as in steps S240 and S260 of the above second embodiment.

Further, the air conditioning capability for the non-specific region is calculated based on the degree of risk of the window fogging calculated in step S330. Specifically, when the degree of risk of the window fogging is equal to or more than a predetermined level, the risk of the window fogging is determined to be caused, and thus the air conditioning capability for the non-specific region is set to a large one. Alternatively, the higher the degree of risk of the window fogging, the more the air conditioning capability for the non-specific region may be determined to be.

In step S350, comparison among three air conditioning capabilities calculated in step S340 (namely, the air conditioning capability for the non-specific region calculated based on the blower suction pressure, the air conditioning capability for the non-specific region calculated based on the air conditioning load, and the air conditioning capability for the non-specific region calculated based on the degree of risk of the window fogging) is performed. The largest air conditioning capability among them is used.

Thus, when there is a risk of window fogging even in the specific-region prioritizing air conditioning mode, the air conditioning capability for the non-specific region can be increased, which can prevent the fogging of the window in the non-specific region in the specific-region prioritizing air conditioning mode.

Fourth Embodiment

In a fourth embodiment of the invention, when the air conditioning of the non-specific region is set, the specific-region prioritizing air conditioning mode is stopped, and switched to the normal blowing mode.

Figure 18:
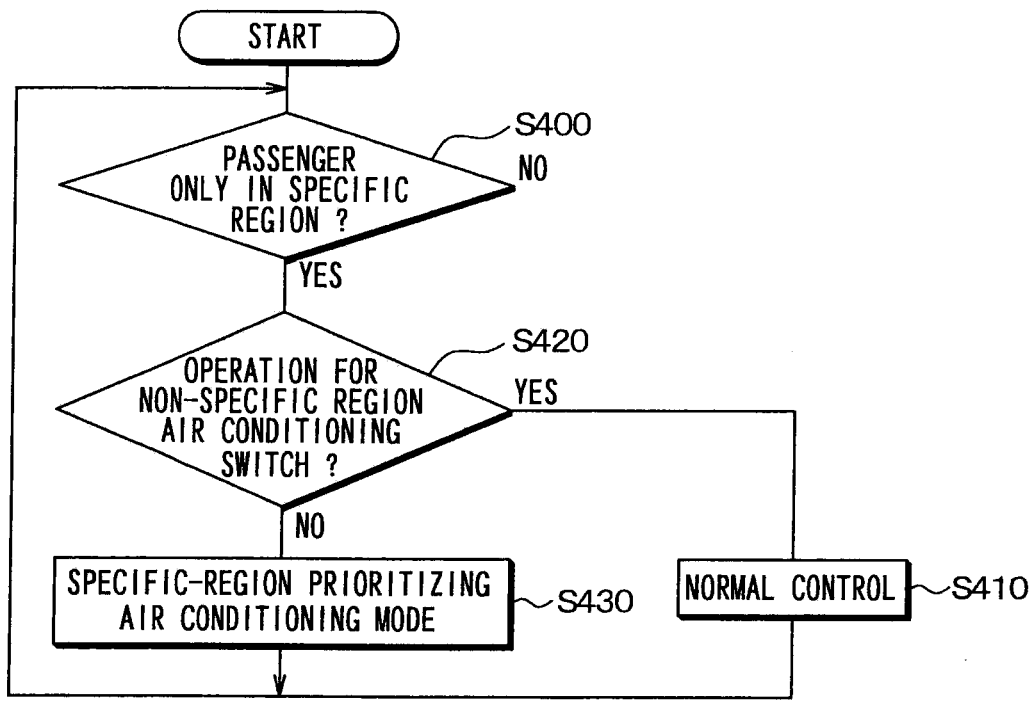
FIG. 18 is a flowchart showing a part of a control process performed in a fourth embodiment.

FIG. 18 is a flowchart showing a part of a control process performed by the air conditioning controller 40. The air conditioning controller determines whether or not the passenger occupies the seat only in the specific region in step S400. The determination is made based on a detection signal from the occupied seat detecting sensor 56.

In this embodiment, the driver-seat side region is defined as the specific region, and the front-passenger-seat side region and the rear-seat side region are defined as the non-specific region.

When the passenger is determined to occupy the seat in a region other than the specific region (if NO), the operation proceeds to step S410, in which the normal blowing mode is determined. The operation of the normal blowing mode is performed in the same way as the above first to fourth embodiments.

When the passenger is determined to occupy the seat only in the specific region in step S400 (if YES), the operation proceeds to step S420, in which it is determined whether or not the operation of a non-specific region air conditioning switch is performed. The non-specific region air conditioning switch is a switch (air conditioning operation unit) for setting the air conditioning of the non-specific region. In this example, it is determined whether a switch for setting the air conditioning in the front-passenger-seat side region and the rear-seat side region among various switches provided on an air conditioning operation panel 60 is operated or not.

When a non-specific region air conditioning switch is determined not to be operated (if NO), the operation proceeds to step S410, in which the normal blowing mode is determined. When the operation of the non-specific region air conditioning switch is determined to be performed (if YES), the operation proceeds to step S430, in which the specific-region prioritizing air conditioning mode is determined.

This embodiment switches the specific-region prioritizing air conditioning mode to the normal blowing mode according to the passenger's operation of the switch, and thus can perform air conditioning according to the passenger's requirements. The use of the existing non-specific region air conditioning switch switches the specific-region prioritizing air conditioning mode to the normal blowing mode, which can reduce an increase in cost without providing a new dedicated switch.

Fifth Embodiment

In a fifth embodiment, in the specific-region prioritizing air conditioning mode, the opening degree of the air outlet on the non-specific region side is increased and decreased over time, which fluctuates the flow amount of air blown into the specific region. The fluctuated air conditioning improves the comfort to the passenger at the driver seat.

Figure 19:
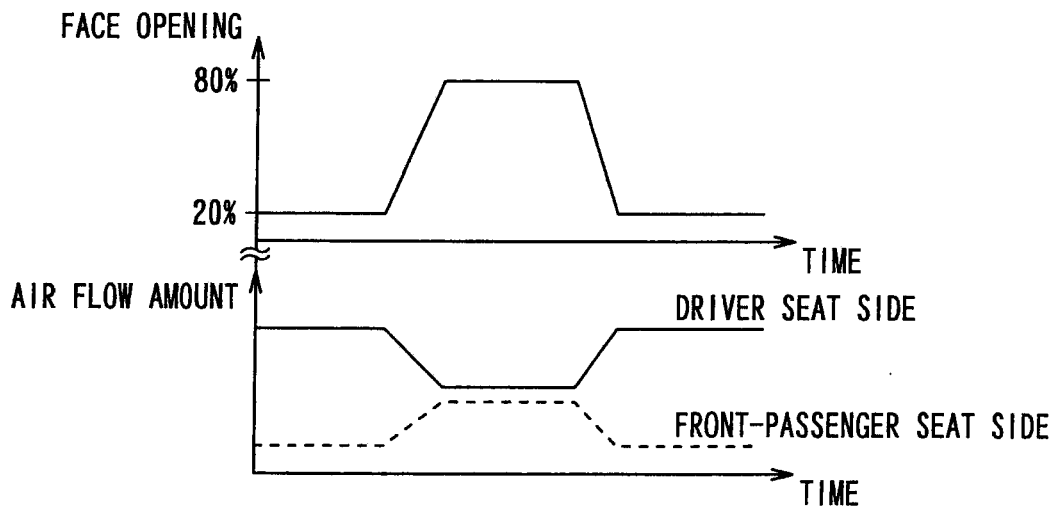
FIG. 19 is a time chart showing an operating example in a fifth embodiment.

FIG. 19 shows a time chart of an operation example of this embodiment. For example, in a face mode, the opening degree of the front-passenger-seat side face opening 14 is increased and decreased over time by the front-passenger-seat side face opening and closing door 20. Thus, the flow amount of air on the front-passenger-seat side (flow amount of air blown from the front-passenger-seat side face opening 14) is increased or decreased, so that together with this, the flow amount of air on the driver-seat side (flow amount of air blown from the driver-seat side face opening 13) is increased or decreased in the direction opposite to the flow amount of air on the front-passenger-seat side. Thus, the desired fluctuated air conditioning is achieved in the driver-seat side region (specific region).

Sixth Embodiment

Figure 20:
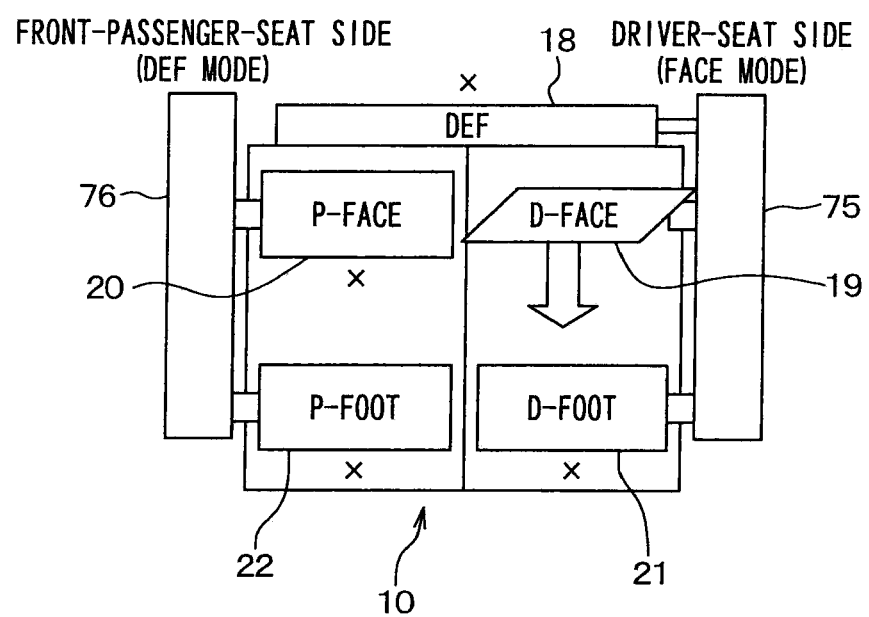
FIG. 20 is a schematic diagram showing an air conditioning unit of an air conditioner for a vehicle according to a sixth embodiment.

In a sixth embodiment, a specific mechanism for switching to the specific-region prioritizing air conditioning mode will be described below. FIG. 20 shows a schematic diagram of an air conditioning unit 10 of this embodiment.

A driver-seat side link module 75 (specific-region side link mechanism) and a front-passenger-seat side link module 76 (non-specific region side link mechanism) are disposed outside the casing 11.

The driver-seat side link module 75 drives the defroster opening and closing door 18, the driver-seat side face opening and closing door 19, and the driver-seat side foot opening and closing door 21 in cooperation with each other. Specifically, the driver-seat side link module 75 includes a link member coupled to the defroster opening and closing door 18, the driver-seat side face opening and closing door 19, and the driver-seat side foot opening and closing door 21, and an actuator for driving the link member.

The front-passenger-seat side link module 76 drives the front-passenger-seat side face opening and closing door 20 and the front-passenger-seat side foot opening and closing door 22 in cooperation with each other. Specifically, the front-passenger-seat side link module 76 includes a link member coupled to the front-passenger-seat side face opening and closing door 20 and the front-passenger-seat side foot opening and closing door 22, and an actuator for driving the link member.

The driver-seat side link module 75 and the front-passenger-seat side link module 76 include five modes as an operation mode, namely, a face mode, a bi-level mode, a foot mode, a foot defroster mode, and a defroster mode. The five modes will be described below.

(1) Face Mode

The driver-seat side link module 75 drives the defroster opening and closing door 18 such that the door 18 is located in the position for completely closing the defroster opening 12. The link module 75 also drives the driver-seat side face opening and closing door 19 such that the door 19 is located in the position for opening the driver-seat side face opening 13. The link module 75 further drives the driver-seat side foot opening and closing door 21 such that the door 21 is located in the position for completely closing the driver-seat side foot opening 15.

In contrast, the front-passenger-seat side link module 76 drives the front-passenger-seat side face opening and closing door 20 such that the door 20 is located in the position for opening the front-passenger-seat side face opening 14. The link module 76 also drives the front-passenger-seat side foot opening and closing door 22 such that the door 22 is located in the position for fully opening the front-passenger-seat side foot opening 16.

(2) Bi-Level Mode

The driver-seat side link module 75 drives the defroster opening and closing door 18 such that the door 18 is located in the position for completely closing the defroster opening 12. The link module 75 also drives the driver-seat side face opening and closing door 19 such that the door 19 is located in the position for opening the driver-seat side face opening 13. The link module 75 further drives the driver-seat side foot opening and closing door 21 such that the door 21 is located in the position for opening the driver-seat side foot opening 15.

In contrast, the front-passenger-seat side link module 76 drives the front-passenger-seat side face opening and closing door 20 such that the door 20 is located in the position for opening the front-passenger-seat side face opening 14. The link module 76 also drives the front-passenger-seat side foot opening and closing door 22 such that the door 22 is located in the position for opening the front-passenger-seat side foot opening 16.

(3) Foot Mode

The driver-seat side link module 75 drives the defroster opening and closing door 18 such that the door 18 is located in the position for completely closing the defroster opening 12. The link module 75 also drives the driver-seat side face opening and closing door 19 such that the door 19 is located in the position for completely closing the driver-seat side face opening 13. The link module 75 further drives the driver-seat side foot opening and closing door 21 such that the door 21 is located in the position for opening the driver-seat side foot opening 15.

In contrast, the front-passenger-seat side link module 76 drives the front-passenger-seat side face opening and closing door 20 such that the door 20 is located in the position for completely closing the front-passenger-seat side face opening 14. The link module 76 also drives the front-passenger-seat side foot opening and closing door 22 such that the door 22 is located in the position for opening the front-passenger-seat side foot opening 16.

(4) Foot Defroster Mode

The driver-seat side link module 75 drives the defroster opening and closing door 18 such that the door 18 is located in the position for opening the defroster opening 12. The link module 75 also drives the driver-seat side face opening and closing door 19 such that the door 19 is located in the position for completely closing the driver-seat side face opening 13. The link module 75 further drives the driver-seat side foot opening and closing door 21 such that the door 21 is located in the position for opening the driver-seat side foot opening 15.

In contrast, the front-passenger-seat side link module 76 drives the front-passenger-seat side face opening and closing door 20 such that the door 20 is located in the position for completely closing the front-passenger-seat side face opening 14. The link module 76 also drives the front-passenger-seat side foot opening and closing door 22 such that the door 22 is located in the position for opening the front-passenger-seat side foot opening 16.

(5) Defroster Mode

The driver-seat side link module 75 drives the defroster opening and closing door 18 such that the door 18 is located in the position for opening the defroster opening 12. The link module 75 also drives the driver-seat side face opening and closing door 19 such that the door 19 is located in the position for completely closing the driver-seat side face opening 13. The link module 75 further drives the driver-seat side foot opening and closing door 21 such that the door 21 is located in the position for completely closing the driver-seat side foot opening 15.

In contrast, the front-passenger-seat side link module 76 drives the front-passenger-seat side face opening and closing door 20 such that the door 20 is located in the position for completely closing the front-passenger-seat side face opening 14. The link module 76 also drives the front-passenger-seat side foot opening and closing door 22 such that the door 22 is located in the position for completely closing the front-passenger-seat side foot opening 16.

The face mode, the bi-level mode, the foot mode, and the foot defroster mode can be represented as a non-defroster mode.

Next, the operation of the specific-region prioritizing air conditioning mode will be described below. In the specific-region prioritizing air conditioning mode, the driver-seat side link module 75 is set in the non-defroster mode, and the front-seat side link module 76 is set in the defroster mode. Thus, the front-passenger-seat side face opening 14 and the front-passenger-seat side foot opening 16 are closed, which can shut the blowout toward the front-passenger-seat side. FIG. 20 shows the operation state in the face mode of the specific-region prioritizing air conditioning mode.

In this embodiment, the combination of the existing five operation modes enables switching to the specific-region prioritizing air conditioning mode. Thus, the specific-region prioritizing air conditioning can be achieved without designing and manufacturing a new link member for the specific-region prioritizing air conditioning mode.

Seventh Embodiment

In a seventh embodiment, the blowing modes performed by the opening and closing mechanisms 18 to 23 are classified into the four-seat blowing mode (normal blowing mode), the one-seat concentration mode (driver-seat side prioritizing blowing mode), and the intermediate blowing mode.

The four-seat blowing modes include a four-seat face mode for blowing the conditioned air from the face air outlets 27 and 29, a four-seat bi-level mode for blowing the conditioned air from the face air outlets 27 and 29 and the foot air outlets 31, 33, and 35, and a four-seat foot mode for blowing the conditioned air from the foot air outlets 31, 33, and 35. In this embodiment, a small flow amount of the conditioned air is also blown out of the face air outlets 27 and 29 in the four-seat foot mode.

Figure 21A:
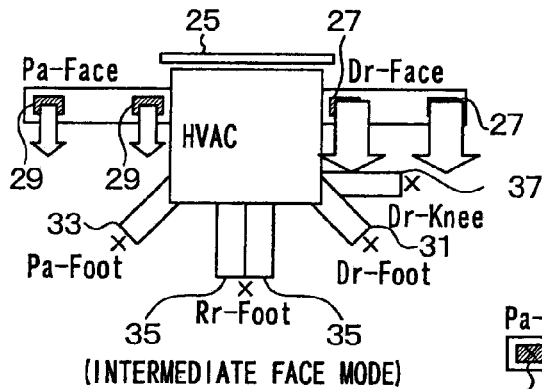
FIG. 21A is a diagram for explaining an intermediate blowing mode in a seventh embodiment.
Figure 21B:
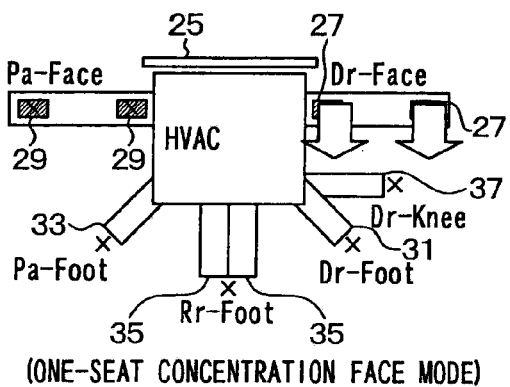
FIG. 21B is a diagram for explaining a one-seat concentration mode in the seventh embodiment.
Figure 21C:
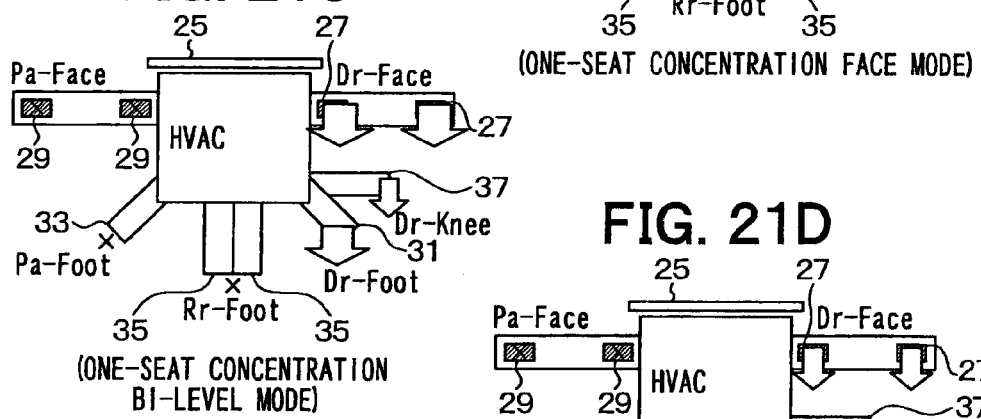
FIG. 21C is a diagram for explaining another one-seat concentration mode in the seventh embodiment.
Figure 21D:
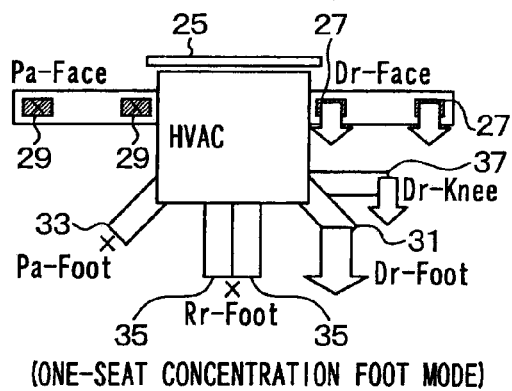
FIG. 21D is a diagram for explaining another one-seat concentration mode in the seventh embodiment.

The one-seat concentration modes include a one-seat concentration face mode (see FIG. 21B), a one-seat concentration bi-level mode (see FIG. 21C), and a one-seat concentration foot mode (see FIG. 21D).

The one-seat concentration face mode is a blowing mode for interrupting the blowout from the front-passenger-seat side face air outlet 29 as compared to the four-seat face mode, and is performed mainly at the time of a low load in summer.

The one-seat concentration bi-level mode is a blowing mode for interrupting the blowout from the front-passenger-seat side face air outlet 29, the front-passenger-seat side foot air outlet 33, and the rear-seat side foot air outlet 35 as compared to the four-seat bi-level mode, and is performed mainly in the intermediate season.

The one-seat concentration foot mode is a blowing mode for interrupting the blowout from the front-passenger-seat side foot air outlet 33 and the rear-seat side foot air outlet 35 as compared to the four-seat foot mode, and is performed mainly at the time of a low load in winter.

Figure 21E:
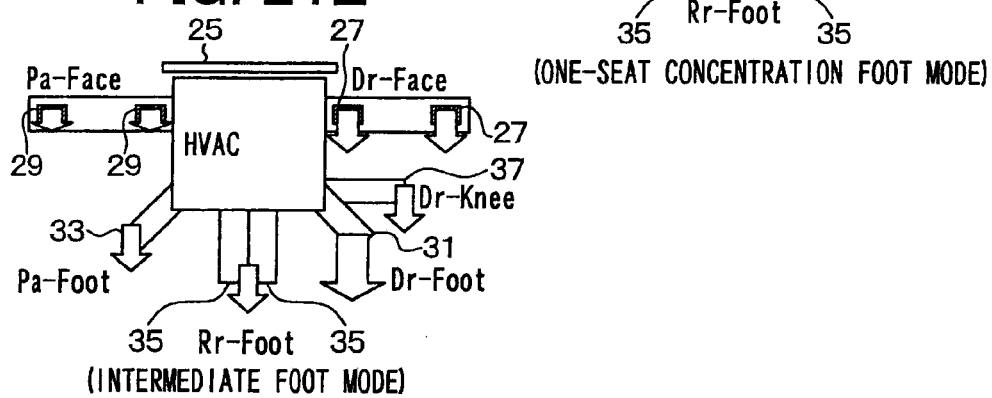
FIG. 21E is a diagram for explaining another intermediate blowing mode in the seventh embodiment.

The intermediate blowing modes include an intermediate face mode shown in FIG. 21A and an intermediate foot mode shown in FIG. 21E.

The intermediate face mode is a mode between the four-seat face mode and the one-seat concentration face mode, and is performed mainly at the time of an intermediate load in summer. Specifically, in the intermediate face mode, the rate of the flow amount of air (degree of opening of) from the front-passenger-seat side face air outlet 29 (Pa-Face) is positioned between that in the face mode and that in the one-seat concentration face mode.

The intermediate foot mode is a mode between the foot mode and the one-seat concentration foot mode, and is performed mainly at the time of an intermediate load in winter. Specifically, in the intermediate foot mode, the rate of the flow amount of air from (degree of opening of) the front-passenger-seat side foot air outlet 23 (Pa-Foot) is positioned between that in the foot mode and that in the one-seat concentration foot mode.

Figure 22:
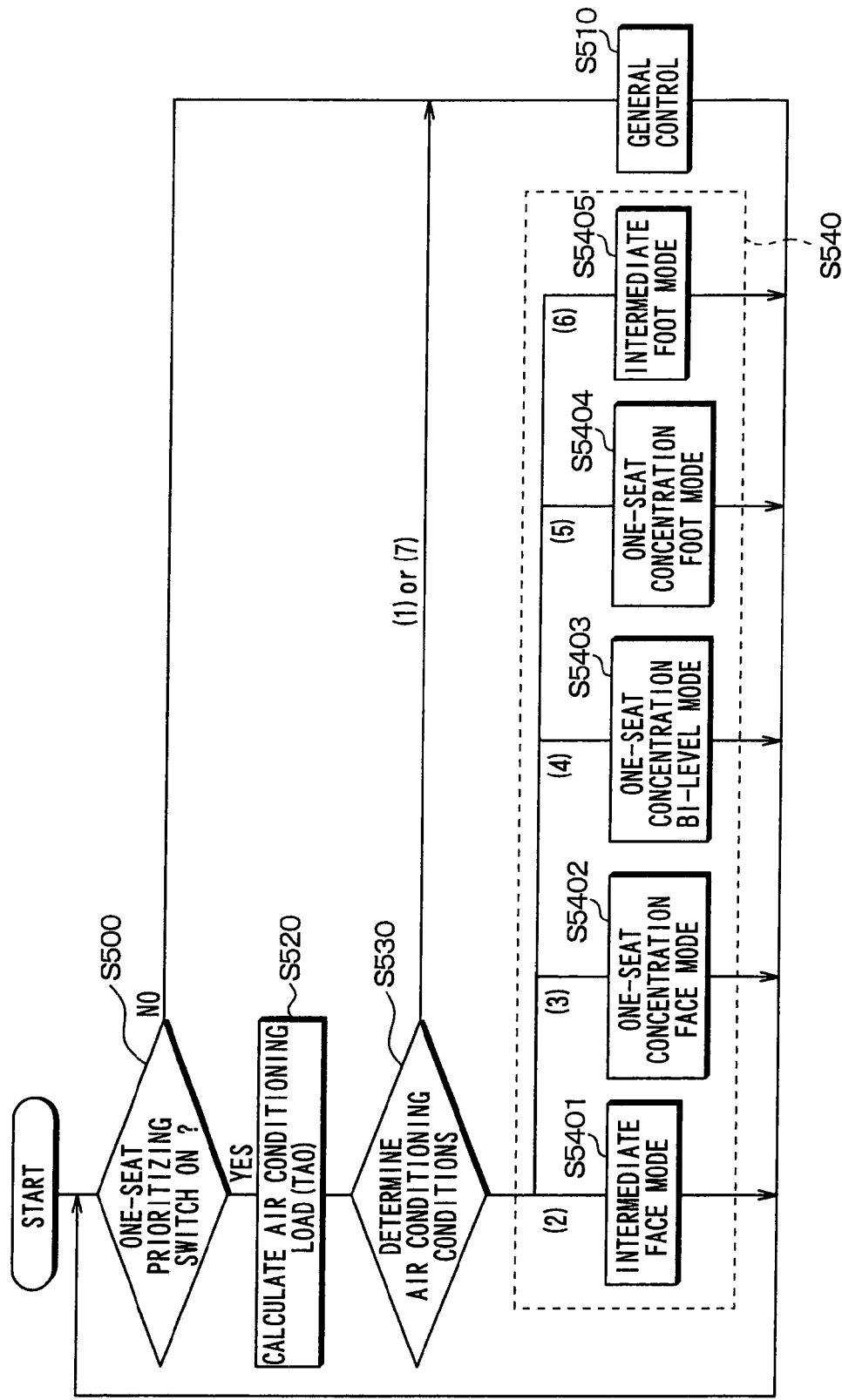
FIG. 22 is a flowchart showing a part of a control process performed in the seventh embodiment.

FIG. 22 is a flowchart showing a part of a control process performed by the air conditioning controller 40. The air conditioning controller first determines whether or not the one-seat prioritizing switch 62 is pushed in step S500. When the one-seat prioritizing switch 62 is determined not to be pushed (turned OFF) (if NO), the operation proceeds to step S510 in which normal blowing mode switching control is performed. In the normal blowing mode switching control, a TAO (target air outlet temperature) is calculated by the above numerical equation (1). Based on the calculated TAO, switching is performed among the four-seat face mode, the four-seat bi-level mode, and the four-seat foot mode.

Specifically, in a low-temperature range (cooling region) of the TAO, the switching is performed to the four-seat face mode. In an intermediate-temperature range of the TAO, the switching is performed to the four-seat bi-level mode. In a high-temperature range (warming range) of the TAO, the switching is performed to the four-seat foot mode.

When the one-seat prioritizing switch 62 is determined to be pushed (turned ON) in step S500 (if YES), the operation proceeds to step S520, in which a TAO (target air outlet temperature) as the index indicative of the level of air conditioning load is calculated based on the above numerical formula (1).

Then, conditions for air conditioning are determined based on the TAO in step S530. In this embodiment, it is determined whether or not the TAO is in any one of the regions (1) to (7) shown in FIG. 23. Specifically, when the TAO is equal to or less than the low-temperature side predetermined load C1, the TAO is determined to be in the region (1). When the TAO is more than the low-temperature side predetermined load C1 and less than the low-temperature side predetermined load C2, the TAO is determined to be in the region (2). When the TAO is equal to or more than the low-temperature side predetermined load C2, and equal to or less than the low-temperature side predetermined load C3, the TAO is determined to be in the region (3). When the TAO is more than the low-temperature side predetermined load C3 and less than the high-temperature side predetermined load H3, the TAO is determined to be in the region (4). When the TAO is equal to or more than the high-temperature side predetermined load H3, and equal to or less than the high-temperature side predetermined load H2, the TAO is determined to be in the region (5). When the TAO is more than the high-temperature side predetermined load H2 and less than the high-temperature side predetermined load H1, the TAO is determined to be in the region (6). When the TAO is equal to or more than the high-temperature side predetermined load H1, the TAO is determined to be in the region (7).

Figure 23:
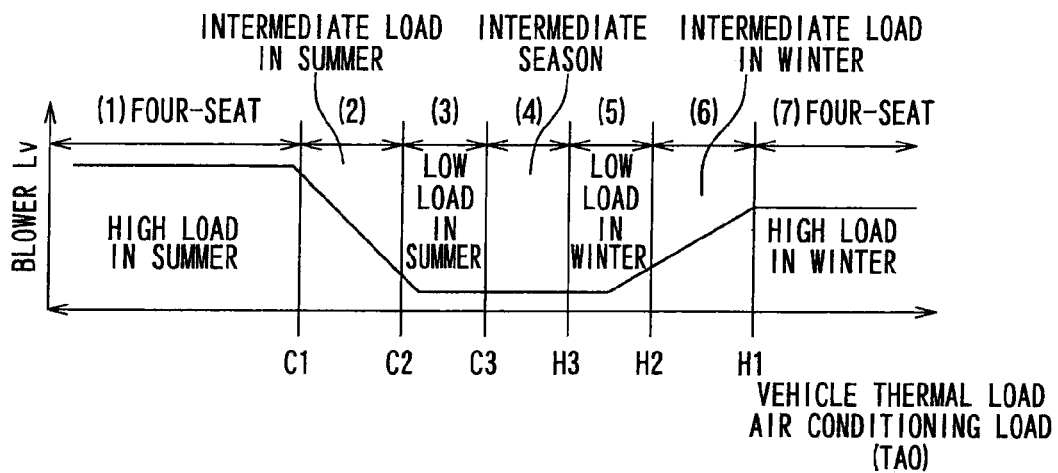
FIG. 23 is a diagram showing a control map used in the seventh embodiment.

As shown in FIG. 23, the regions (1) to (7) of this embodiment can be defined as a high load in summer, an intermediate load in summer, a low load in summer, an intermediate season, a low load in winter, an intermediate load in winter, and a high load in winter in that order.

When the TAO is determined to be in the region (1) or the region (7) in step S530, the operation proceeds to step S510, in which normal blowing mode switching control (normal control) is performed. Specifically, when the TAO is determined to be in the region (1), the four-seat face mode is performed. When the TAO is determined to be in the region (7), the four-seat foot mode is performed.

That is, the cooled air or warm air is blown from the air conditioning unit 10 not only to the driver-seat side region, but also to the front-passenger-seat side region and the rear-seat side region, which suppresses the dispersed distribution of the temperature of the vehicle interior.

At this time, as shown in FIG. 23, the blower level is set to around the maximum value, so that the flow amount of air from the blower 71 is controlled to be around the maximum value. Thus, the flow amount of air blown toward the upper body and lower body (knee and foot) of the passenger at the driver seat is sufficiently ensured, which assures the comfort to the passenger at the driver seat.

When the TAO is determined to be in any one of the regions (2) to (6), the operation proceeds to step S540, in which the one-seat prioritizing control is performed based on the result of the determination made in step S530.

Specifically, when the TAO is determined to be in the region (2) in step S530, the operation proceeds to step S5401, in which the intermediate face mode is performed. In the intermediate face mode, the cooled air is blown mainly from the driver-seat side face air outlet 27, and also a small flow amount of the cooled air is also blown from the front-passenger-seat side face air outlet 29. That is, the cooled air from the air conditioning unit 10 is blown not only to the driver-seat side region, but also to the front-passenger-seat side region. Thus, the warm feeling to the passenger at the driver seat is effectively improved, which suppresses the dispersed distribution of the temperature of the vehicle interior.

When the TAO is determined to be in the region (3) in step S530, the operation proceeds to step S5402, in which the one-seat concentration face mode is performed. In the one-seat concentration face mode, the cooled air is blown only from the driver-seat side face air outlet 27. That is, the cooled air from the air conditioning unit 10 is concentrated on the upper body of the passenger at the driver seat, which improves the warm feeling to the passenger at the driver seat in early stage.

When the TAO is determined to be in the region (4) in step S530, the operation proceeds to step S5403, in which the one-seat concentration bi-level mode is performed. In the one-seat concentration bi-level mode, the conditioned air is blown from the driver-seat side face air outlet 27, the driver-seat side foot air outlet 31, and the driver-seat side knee air outlet 37. That is, the conditioned air is blown not only to the upper body of the passenger at the driver seat, but also the lower body (knee and foot) of the passenger, which effectively ensures the comfort to the passenger at the driver seat.

When the TAO is determined to be in the region (5) in step S530, the operation proceeds to step S5404, in which the one-seat concentration foot mode is performed. In the one-seat concentration foot mode, the warm air is blown mainly from the driver-seat side foot air outlet 31, and also a small flow amount of warm air is blown from the driver-seat side face air outlet 27 and the driver-seat side knee air outlet 37. That is, the warm air from the air conditioning unit 10 is blown mainly to the foot of the passenger at the driver seat, which effectively improves the warm feeling to the passenger at the driver seat.

When the TAO is determined to be in the region (6) in step S530, the operation proceeds to step S5405, in which the intermediate foot mode is performed. In the intermediate foot mode, the warm air is blown mainly from the driver-seat side foot air outlet 31, and also a small flow amount of warm air is blown from the driver-seat side face air outlet 27, the driver-seat side knee air outlet 37, the front-passenger-seat side face air outlet 29, the front-passenger-seat side foot air outlet 33, and the rear-seat side foot air outlet 35. That is, the warm air is blown from the air conditioning unit 10 not only to the driver-seat side region, but also to the front-passenger-seat side region and the rear-seat side region, which effectively improves the warm feeling to the passenger at the driver seat while suppressing the dispersed distribution of the temperature of the vehicle interior.

In this embodiment, the switching is performed to the four-seat blowing mode, the one-seat concentration mode, and the intermediate blowing mode according to the thermal load and the air conditioning mode of the vehicle, and thus can ensure the comfort to the passenger while saving the power.

Specifically, for the cooling load of a first predetermined load C1 or more, or for the heating load of a first predetermined load H1 or more, this state is determined to be in the state at the time of a high load when the dispersed distribution of the temperature of the vehicle interior is more likely to be caused (at the time of a high load in summer or at the time of a high load in winter). Then, the four-seat blowing mode (four-seat face mode or four-seat foot mode) is performed, which can suppress the dispersed distribution of the temperature of the vehicle interior to ensure the comfort to the passenger.

For the cooling load of a second predetermined load C2 or less, or for the heating load of a second predetermined load H2 or less, this state is determined to be in the state at the time of a low load when the dispersed distribution of the temperature of the vehicle interior is less likely to be caused (at the time of a low load in summer or at the time of a low load in winter). Then, the one-seat concentration mode (one-seat concentration face mode or one-seat concentration foot mode) is performed, which can save the power.

For the cooling load of more than the first predetermined load C1 and less than the second predetermined load C2, or for the heating load of more than the first predetermined load H1 and less than the second predetermined load H2, this state is determined to be in the state at the time of an intermediate load (at the time of an intermediate load in summer or at the time of an intermediate load in winter). Then, the intermediate blowing mode (intermediate face mode or intermediate foot mode) is performed, which can ensure the comfort to the passenger by suppressing the dispersed distribution of the temperature of the vehicle interior, while saving the power.

Figure 24:
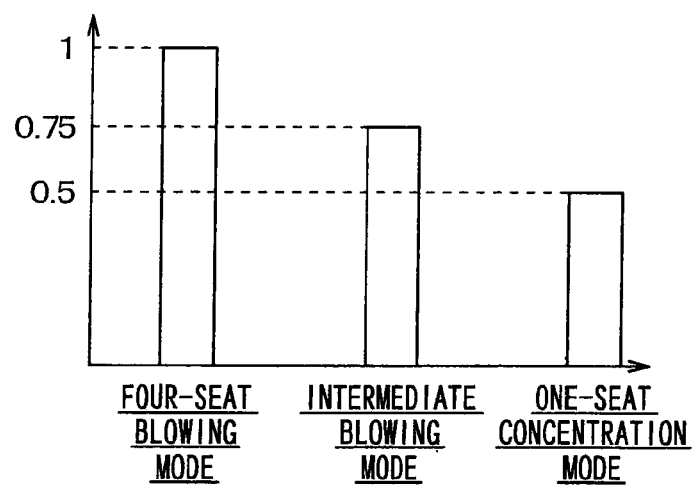
FIG. 24 is a graph showing an air conditioning capability in each blowing mode in the seventh embodiment.

FIG. 24 shows the comparison among air conditioning capabilities in the four-seat blowing mode, in the intermediate blowing mode, and in the one-seat concentration mode. As illustrated in the example of FIG. 24, about 25% power saving effect in the intermediate blowing mode (intermediate face, or intermediate foot) can be obtained as compared to that in the four-seat blowing mode (four-seat face or four-seat foot), whereas about 50% power saving effect in the one-seat concentration mode (one-seat concentration face, one-seat concentration bi-level, or one-seat concentration foot) can be obtained as compared to that in the four-seat blowing mode (four-seat face, four-seat bi-level, or four-seat foot).

As modified examples of this embodiment, an intermediate face mode and an intermediate foot mode may be structured as shown in FIGS. 25A and 25B. That is, among the front-passenger-seat side face air outlets 29, a front-passenger-seat side center face air outlet 29a disposed near the driver seat, and a front-passenger-seat side side-face air outlet 29b apart from the drive seat can be independently opened and closed. In the intermediate face mode and in the intermediate foot mode, the front-passenger-seat side center face air outlet 29a may be opened and the front-passenger-seat side side-face air outlet 29b may be closed.

In the modified example, the conditioned air is blown from the front-passenger-seat side center face air outlet 29a near the driver seat, which can effectively suppress the dispersed distribution of the temperature of the vehicle interior in the vicinity of the driver seat. This embodiment can ensure the comfort to the driver, while saving the power.

Eighth Embodiment

Although in the above seventh embodiment, the four-seat face mode is performed at the time of the high load in summer, in an eighth embodiment, the intermediate face mode is performed at the time of the high load in summer when the energy saving mode (eco mode) is selected, or when the seat air conditioner 43 is operated.

Figure 16:
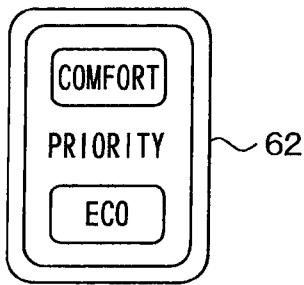
FIG. 16 is a diagram showing a one-seat prioritizing switch.

In this embodiment, the energy saving mode is set by the passenger's operation of the one-seat prioritizing switch 62. As shown in FIG. 16 described above, the one-seat prioritizing switch 62 can also select the comfortable mode (comfort) and the energy saving mode (eco), in addition to the one-seat prioritizing mode.

Figure 26:
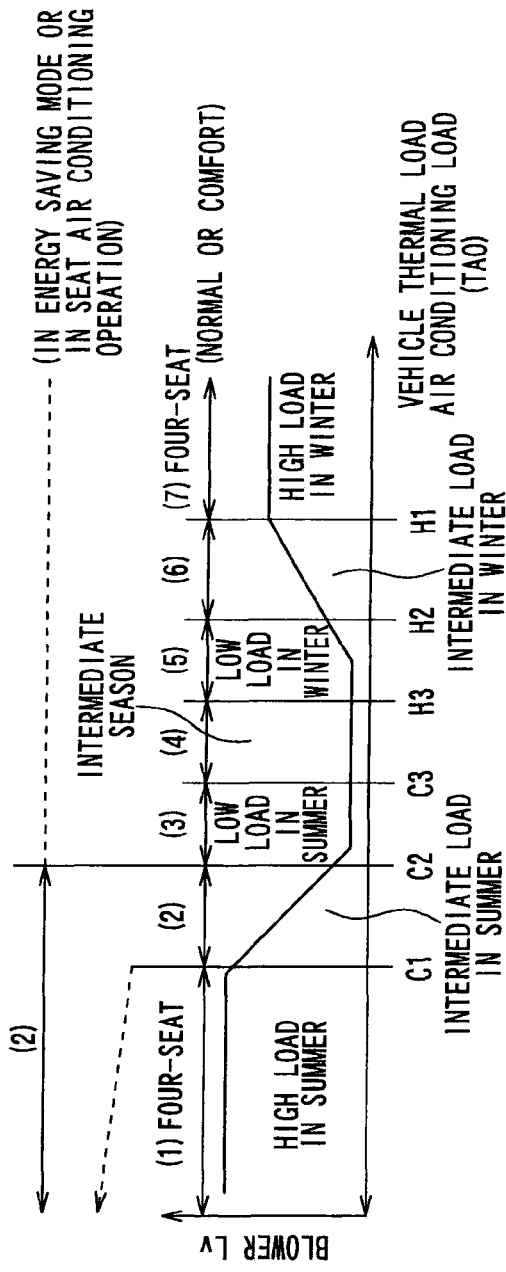
FIG. 26 is a diagram showing a control map used in an eighth embodiment.

As shown in FIG. 26, in the case where the one-seat prioritizing mode is selected, when the seat air conditioner 43 is not operated without selection of the energy saving mode (at the normal time or comfortable time), the four-seat face mode is performed at the time of a high load in summer like the above first embodiment. When the energy saving mode is selected (in the energy saving mode) or when the seat air conditioner 43 is operated (in the seat air conditioning operation), the intermediate face mode is performed at the high load in summer.

Specifically, in step S530 shown in FIG. 22, the low-temperature side predetermined load C1 used for determination of the conditions for air conditioning may be shifted to the lower limit (minimum temperature) of the TAO.

Thus, when the one-seat prioritizing mode is selected, the effect of saving power can be obtained by selecting the energy saving mode so as to give more priority to the power saving than to the comfort at the time of a high load in summer. Even when the one-seat prioritizing mode is selected, upon the operation of the seat air conditioner 43, the passenger at the driver seat can efficiently feel cool by the blast air from the seat air conditioner 43. At the time of the high load in summer, the intermediate face mode is performed, so that the effect of saving the power can be further obtained without degrading the comfort to the passenger at the driver seat.

The selection of the energy saving mode may be performed not only by the operation of the one-seat prioritizing switch 62, but also automatically by the air conditioning controller 40.

Ninth Embodiment

Although in the above seventh embodiment, the four-seat face mode is performed at the time of a high load in summer and the intermediate face mode is performed at the time of an intermediate load in summer, in a ninth embodiment, upon selecting the energy saving mode (eco mode) or upon operating the seat air conditioner 43, the intermediate face mode is performed at the time of a high load in summer, and the one-seat concentration face mode is performed at the time of an intermediate load in summer.

Figure 27:
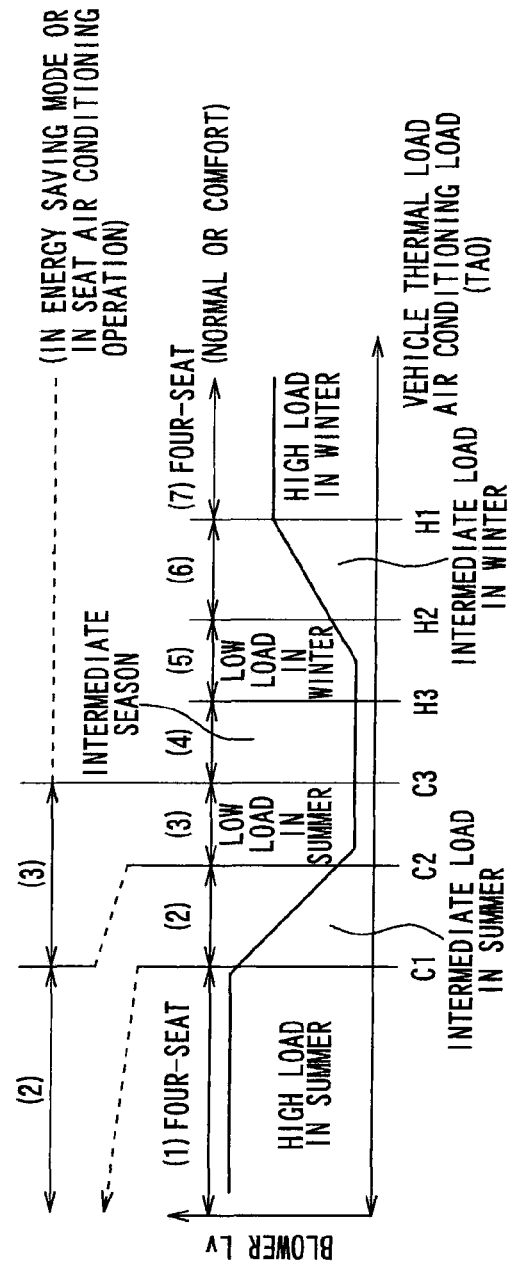
FIG. 27 is a diagram showing a control map used in a ninth embodiment.

As shown in FIG. 27, in the case where the one-seat prioritizing mode is selected, when the seat air conditioner 43 is not operated without selection of the energy saving mode (at the normal time or comfortable time), the four-seat face mode is performed at the time of a high load in summer, or the intermediated face mode is performed at the time of an intermediate load in summer, like the above first embodiment. Upon selecting the energy saving mode (in the energy saving mode) or upon operating the seat air conditioner 43 (in the seat air conditioning operation), the intermediate face mode is performed at the high load in summer, or the one-seat concentration face mode is performed at the intermediate load in summer.

Specifically, in step S530 shown in FIG. 22, the low-temperature side predetermined load C1 to be used for determination of the conditions for air conditioning may be changed to the lower limit (minimum temperature) of the TAO, and the low-temperature side predetermined load C2 may be shifted to a predetermined value on the lower temperature side (on the higher load cooling side).

Thus, when the one-seat prioritizing mode is selected, the effect of saving power can be obtained by selecting the energy saving mode so as to give more priority to the power saving than to the comfort at the time of a high load in summer. Even when the one-seat prioritizing mode is selected, upon the operation of the seat air conditioner 43, the passenger at the driver seat can efficiently feel cool by the blast air from the seat air conditioner 43. At the time of a high load in summer, the intermediate face mode is performed, or at the time of an intermediate load in summer, the one-seat concentration face mode is performed, so that the effect of saving the power can be further obtained without degrading the comfort to the passenger at the driver seat.

Tenth Embodiment

In the seventh embodiment, the four-seat face mode is performed at the time of a high load in summer, the intermediate face mode is performed at the time of an intermediate load in summer, and the one-seat concentration face mode is performed at the time of a low load in summer. However, in a tenth embodiment, upon selecting the energy saving mode (eco mode) or upon operating the seat air conditioner 43, switching to the four-seat face mode, the intermediate face mode, and the one-seat concentration face mode is determined on the higher load side.

Figure 28:
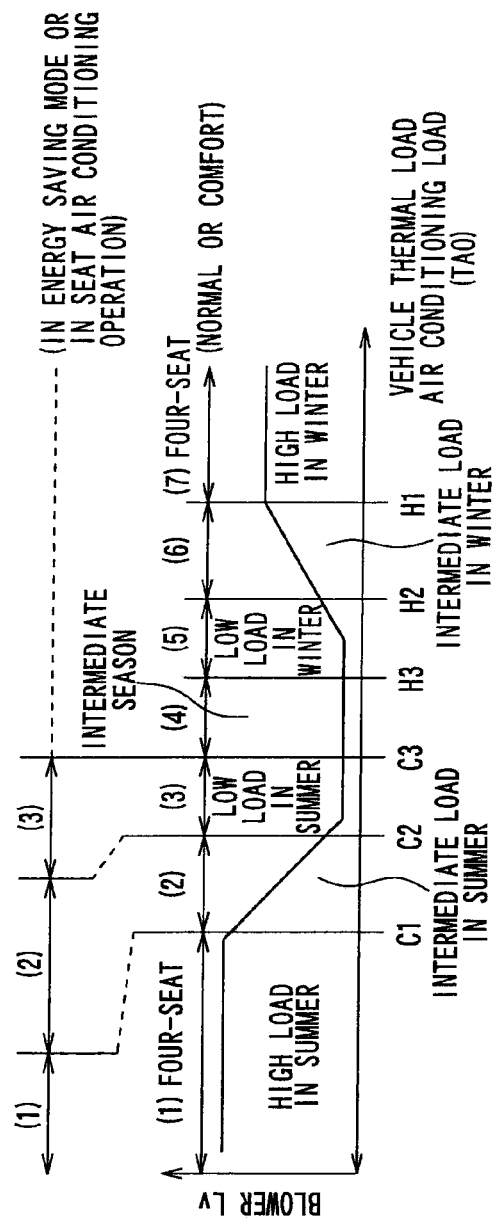
FIG. 28 is a diagram showing a control map used in a tenth embodiment.

As shown in FIG. 28, in the case where the one-seat prioritizing mode is selected, when the seat air conditioner 43 is not operated without selection of the energy saving mode (at the normal time or comfortable time), the four-seat face mode is performed at the time of a high load in summer, or the intermediated face mode is performed at the time of an intermediate load in summer, like the above first embodiment. When the energy saving mode is selected (in the energy saving mode) or when the seat air conditioner 43 is operated (in the seat air conditioning operation), the switching to the four-seat face mode, the intermediate face mode, and the one-seat concentration face mode is determined on the higher load side.

Specifically, in step S530 shown in FIG. 22, each of the low-temperature side predetermined load C1 and the low-temperature side predetermined load C2 to be used for determination of the conditions for the air conditioning is changed to a predetermined value on the lower temperature side (higher load cooling side).

Thus, even when the one-seat prioritizing mode is selected, the effect of saving power can be obtained by selecting the energy saving mode so as to give more priority to the power saving than to the comfort at the time of a high load in summer, at the time of an intermediate load in summer, and at the time of a low load in summer. Even when the one-seat prioritizing mode is selected, upon operating the seat air conditioner 43, the passenger at the driver seat can efficiently feel cool by receiving the blast air from the seat air conditioner 43. The switching to the four-seat face mode, the intermediate face mode, and the one-seat concentration face mode is determined on the higher load side, which can further obtain the effect of power saving without degrading the comfort to the passenger at the driver seat.

Eleventh Embodiment

In the seventh embodiment, the four-seat face mode is performed at the time of a high load in summer, and the intermediate face mode is performed at the time of an intermediate load in summer. However, in an eleventh embodiment, upon selecting the energy saving mode (eco mode) or upon operating the seat air conditioner 43, the one-seat concentration face mode is performed at the time of a high load in summer and at the time of an intermediate load in summer.

Figure 29:
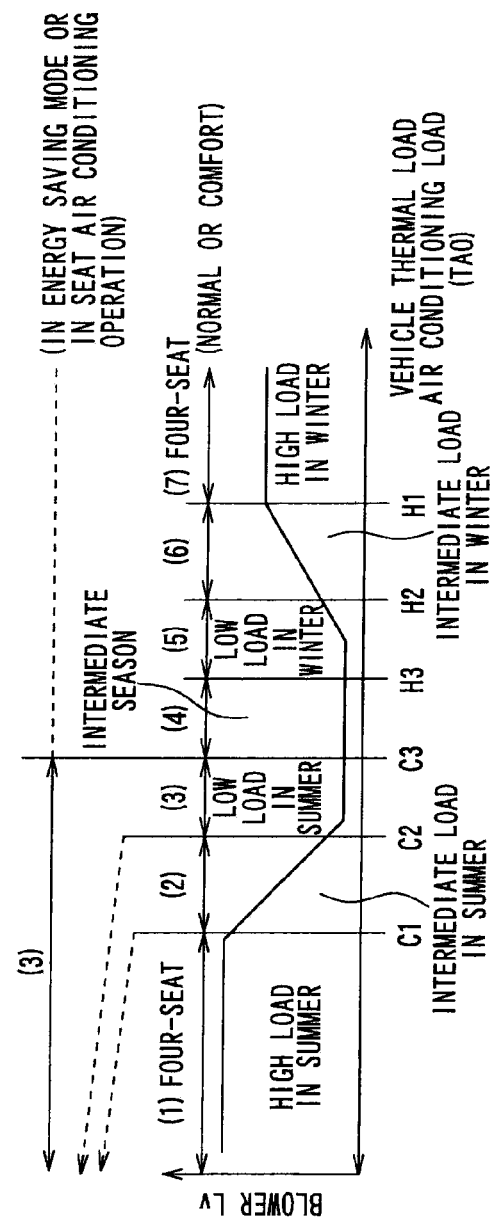
FIG. 29 is a diagram showing a control map used in an eleventh embodiment.

As shown in FIG. 29, in the case where the one-seat prioritizing mode is selected, when the seat air conditioner 43 is not operated without selecting the energy saving mode (at the normal time or comfortable time), the four-seat face mode is performed at the time of a high load in summer, and the intermediated face mode is performed at the time of an intermediate load in summer, like the above first embodiment. When the energy saving mode is selected (in the energy saving mode) or when the seat air conditioner 43 is operated (in the seat air conditioning operation), the one-seat concentration face mode is performed at the time of a high load in summer and at the time of an intermediate load in summer.

Specifically, in step S530 shown in FIG. 22, the low-temperature side predetermined load C1 and the low-temperature side predetermined load C2 to be used for determination of the conditions for the air conditioning may be changed to the lower limit (minimum temperature) of the TAO.

Thus, even when the one-seat prioritizing mode is selected, the effect of saving power can be obtained by selecting the energy saving mode so as to give more priority to the power saving than to the comfort at the time of a high load in summer. Even when the one-seat prioritizing mode is selected, upon operating the seat air conditioner 43, the passenger at the driver seat can efficiently feel cool by receiving the blast air from the seat air conditioner 43. The one-seat concentration face mode is performed at the time of a high load in summer and at the time of an intermediate load in summer, which can further obtain the effect of power saving without degrading the comfort to the passenger at the driver seat.

Twelfth Embodiment

Although in the seventh embodiment, the four-seat foot mode is performed at the time of a high load in summer, in a twelfth embodiment, upon selecting an energy saving mode (eco mode), or upon operating the seat heater 44, the intermediate foot mode is performed at the time of a high load in winter.

Figure 30:
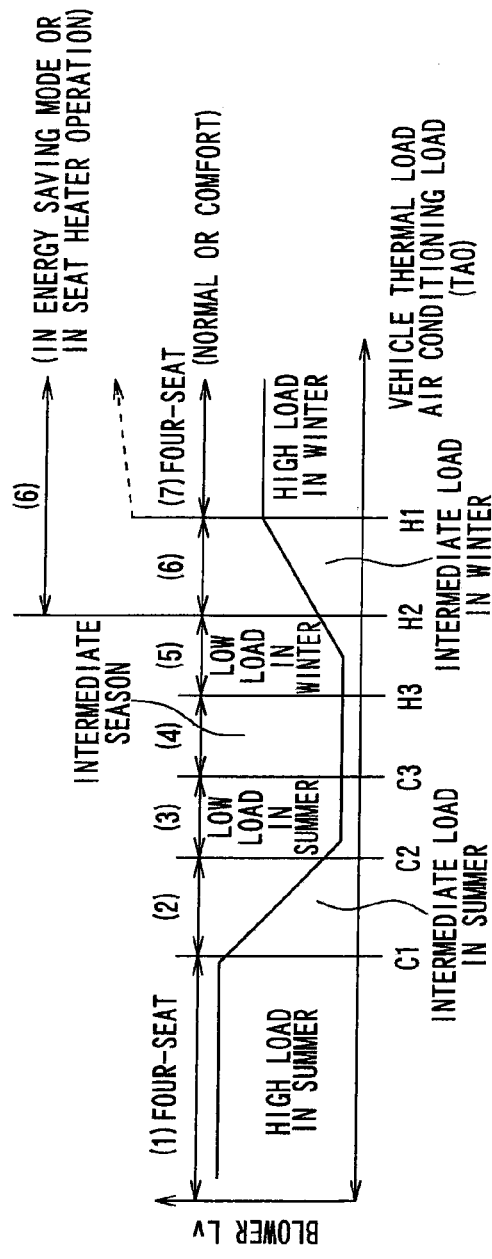
FIG. 30 is a diagram showing a control map used in a twelfth embodiment.

As shown in FIG. 30, in the case where the one-seat prioritizing mode is selected, like the first embodiment, when the seat heater 44 is not operated without selection of the energy saving mode (at the normal time or comfortable time), the four-seat foot mode is performed at the time of a high load in winter. When the energy saving mode is selected (in the energy saving mode) or when the seat heater 44 is operated (in the seat heater operation), the intermediate foot mode is performed at the time of a high load in winter.

Specifically, in step S530 shown in FIG. 22, the high-temperature side predetermined load H1 to be used for determination of the conditions for the air conditioning may be changed to the upper limit (maximum temperature) of the TAO.

Thus, even when the one-seat prioritizing mode is selected, the effect of saving power can be obtained by selecting the energy saving mode so as to give more priority to the power saving than to the comfort at the time of a high load in winter. Even when the one-seat prioritizing mode is selected, upon operating the seat heater 44, the passenger at the driver seat can efficiently feel warm by receiving the blast air from the seat heater 44. The intermediate foot mode is performed at the time of a high load in winter, which can further obtain the effect of power saving without degrading the comfort to the passenger at the driver seat.

Thirteenth Embodiment

Although in the seventh embodiment, the four-seat foot mode is performed at the time of a high load in winter, and the intermediate foot mode is performed at the time of an intermediate load in winter, in a thirteenth embodiment, upon selecting an energy saving mode (eco mode), or upon operating the seat heater 44, switching to the four-seat foot mode and the intermediate foot mode is determined on the higher load side.

Figure 31:
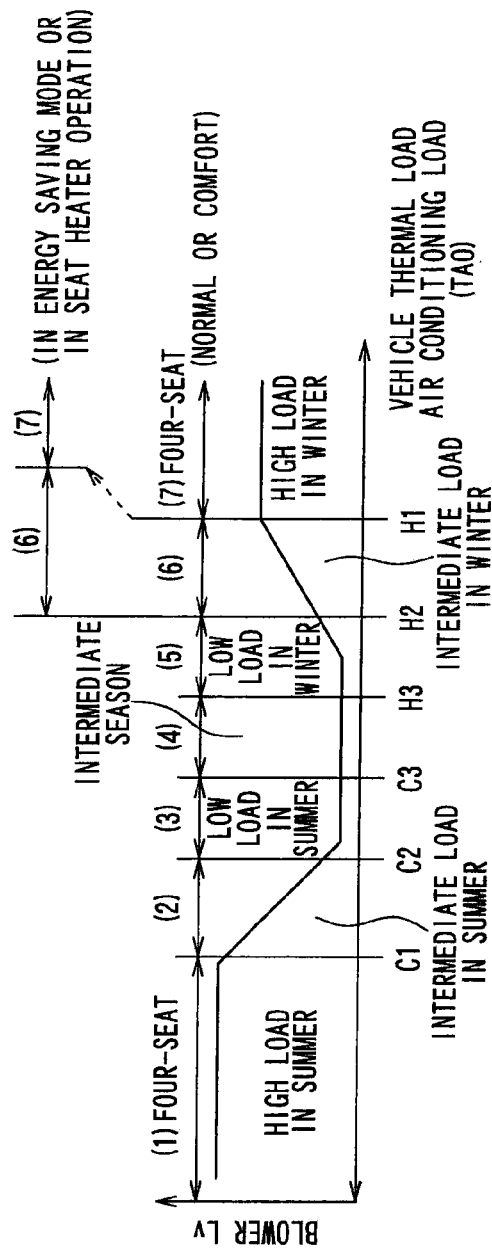
FIG. 31 is a diagram showing a control map used in a thirteenth embodiment.

As shown in FIG. 31, in the case where the one-seat prioritizing mode is selected, when the seat heater 44 is not operated without selection of the energy saving mode (at the normal time or comfortable time), like the first embodiment, the four-seat foot mode is performed at the time of a high load in winter, and the intermediated foot mode is performed at the time of an intermediate load in winter. When the energy saving mode is selected (in the energy saving mode) or when the seat heater 44 is operated (in the seat heater operation), the switching to the four-seat foot mode and the intermediate foot mode is determined on the higher load side.

Specifically, in step S530 shown in FIG. 22, the high-temperature side predetermined load H1 to be used for determination of the conditions for the air conditioning is changed to the predetermined value on the higher temperature side (higher load heating side).

Thus, when the one-seat prioritizing mode is selected, the effect of saving power can be obtained by selecting the energy saving mode so as to give more priority to the power saving than to the comfort at the time of a high load in winter. Even when the one-seat prioritizing mode is selected, upon operating the seat heater 44, the passenger at the driver seat can efficiently feel warm by receiving the blast air from the seat heater 44. The switching to the four-seat foot mode and the intermediate foot mode is performed on the higher load side, which can further obtain the effect of power saving without degrading the comfort to the passenger at the driver seat.

Fourteenth Embodiment

In the above seventh embodiment, the four-seat foot mode is performed at the time of a high load in winter, the intermediate foot mode is performed at the time of an intermediate load in winter, and the one-seat concentration foot mode is performed at the time of a low load in winter. However, in a fourteenth embodiment, upon selecting the energy saving mode (eco mode), or upon operating the seat heater 44, the switching to the four-seat foot mode, the intermediate foot mode, and the one-seat concentration foot mode is determined on the higher load side.

Figure 32:
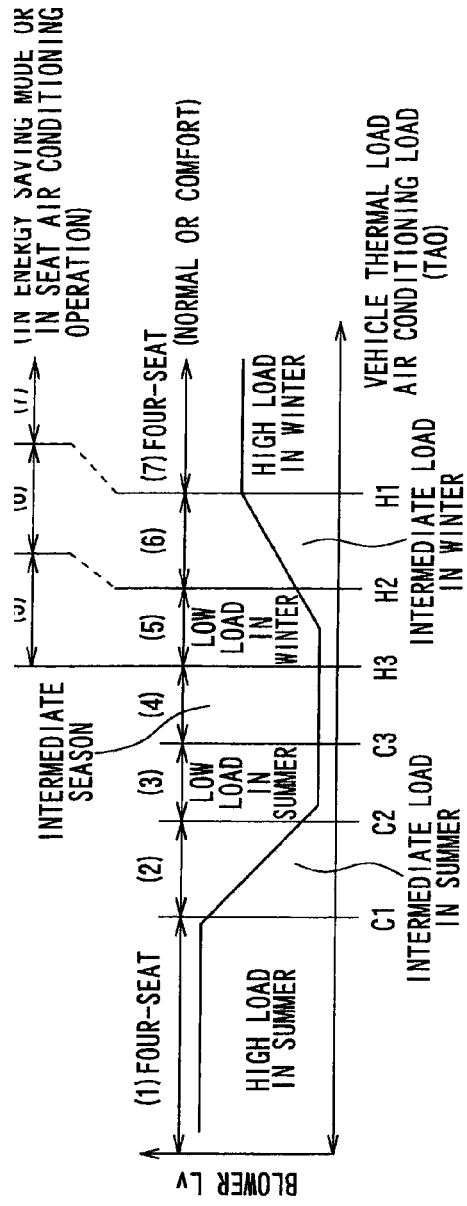
FIG. 32 is a diagram showing a control map used in a fourteenth embodiment.

As shown in FIG. 32, like the first embodiment, in the case where the one-seat prioritizing mode is selected, when the seat heater 44 is not operated without selection of the energy saving mode (at the normal time or comfortable time), the four-seat foot mode is performed at the time of a high load in winter, and the intermediated foot mode is performed at the time of an intermediate load in winter. When the energy saving mode is selected (in the energy saving mode) or when the seat heater 44 is operated (in the seat heater operation), the switching to the four-seat foot mode, the intermediate foot mode, and the one-seat concentration foot mode is determined on the higher load side.

Specifically, in step S530 shown in FIG. 22, the high-temperature side predetermined load H1 and the high-temperature side predetermined load H2 to be used for determination of the conditions for the air conditioning is changed to a predetermined value on the higher temperature side (higher load heating side).

Thus, when the one-seat prioritizing mode is selected, the effect of saving power can be obtained by selecting the energy saving mode so as to give more priority to the power saving than to the comfort at the time of a high load in winter, at the time of an intermediate load in winter, and at the time of a low load in winter. Even when the one-seat prioritizing mode is selected, upon the operation of the seat heater 44, the passenger at the driver seat can efficiently feel warm by receiving the blast air from the seat heater 44. The switching to the four-seat foot mode, the intermediate foot mode, and the one-seat concentration foot mode is determined on the higher load side, which can further obtain the effect of power saving without degrading the comfort to the passenger at the driver seat.

Fifteenth Embodiment

In the above seventh embodiment, the four-seat foot mode is performed at the time of a high load in winter, and the intermediate foot mode is performed at the time of an intermediate load in winter. However, in a fifteenth embodiment, upon selecting the energy saving mode (eco mode), or upon operating the seat heater 44, the one-seat concentration foot mode is performed at the time of a high load in winter and at the time of an intermediate load in winter.

Figure 33:
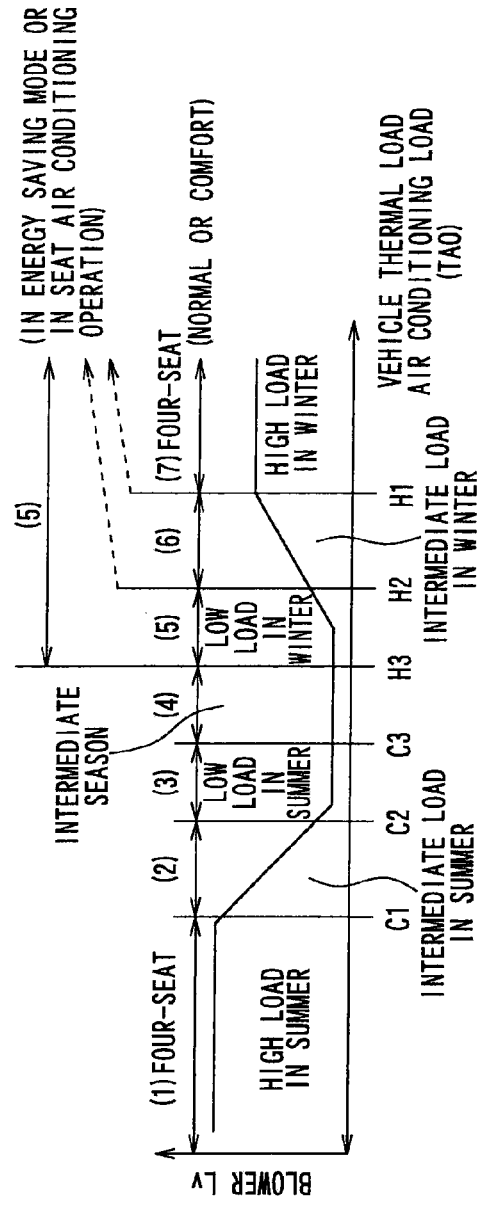
FIG. 33 is a diagram showing a control map used in a fifteenth embodiment.

As shown in FIG. 33, like the first embodiment, in the case where the one-seat prioritizing mode is selected, when the seat heater 44 is not operated without selection of the energy saving mode (at the normal time or comfortable time), the four-seat foot mode is performed at the time of a high load in winter, or the intermediated foot mode is performed at the time of an intermediate load in winter. When the energy saving mode is selected (in the energy saving mode) and when the seat heater 44 is operated (in the seat heater operation), the one-seat concentration foot mode is performed at the time of a high load in winter and at the time of an intermediate load in winter.

Specifically, in step S530 shown in FIG. 22, the high-temperature side predetermined load H1 and the high-temperature side predetermined load H2 to be used for determination of the conditions for the air conditioning should be changed to the upper limit (maximum temperature) of the TAO.

Thus, even when the one-seat prioritizing mode is selected, the effect of saving power can be obtained by selecting the energy saving mode so as to give more priority to the power saving than to the comfort at the time of a high load in winter. Even when the one-seat prioritizing mode is selected, upon operating the seat heater 44, the passenger at the driver seat can efficiently feel warm by receiving the blast air from the seat heater 44. The one-seat concentration foot mode is performed at the time of a high load in winter and at the time of an intermediate load in winter, which can further obtain the effect of power saving without degrading the comfort to the passenger at the driver seat.

Sixteenth Embodiment

In the above seventh embodiment, when the one-seat prioritizing mode is selected, the intermediate foot mode is performed at the time of an intermediate load in winter. However, in a sixteenth embodiment, even when the one-seat prioritizing mode is selected, the four-seat foot mode is performed at the time of the intermediate load in winter under the condition where fogging of the window is supposed to be caused.

Figure 34:
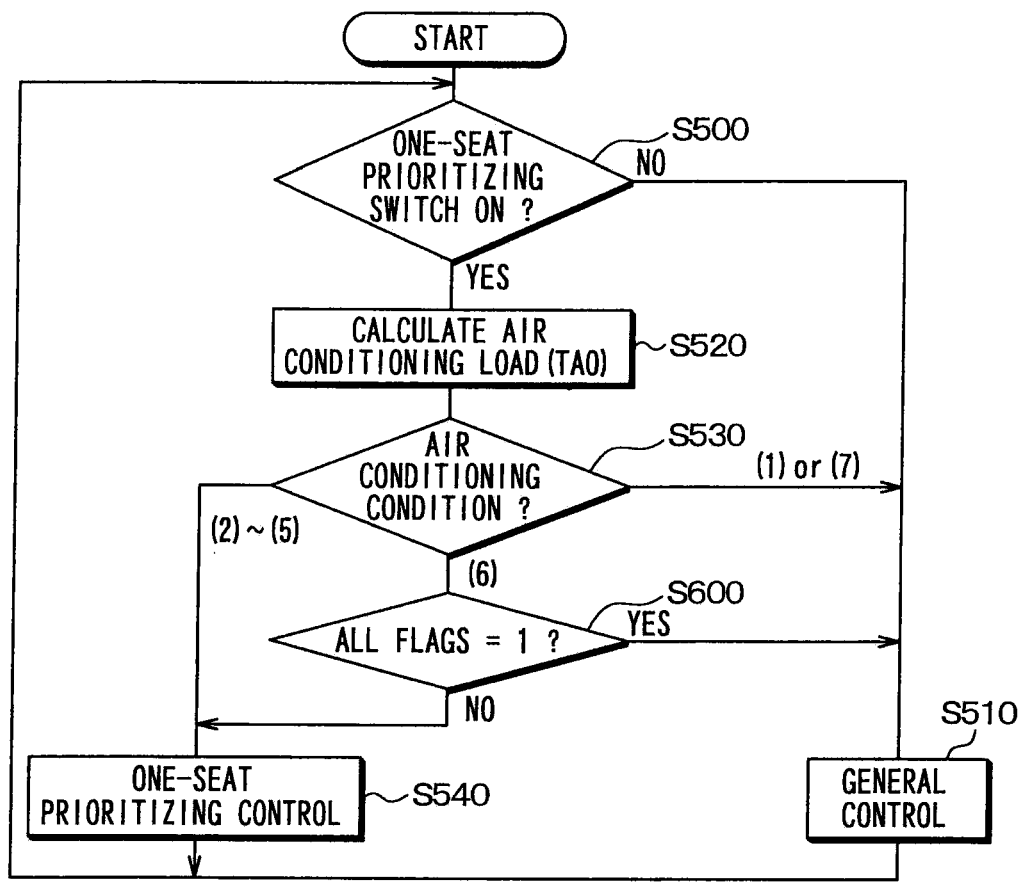
FIG. 34 is a flowchart showing a part of a control process performed in a sixteenth embodiment.

FIG. 34 is a flowchart showing a part of a control process performed in this embodiment, while illustrating step S600 added to the flowchart of FIG. 22. Specifically, when the TAO is determined to be in the region (6) in step S530, the operation proceeds to step S600, in which it is determined whether or not all flags are set to be "1".

Figure 35A:
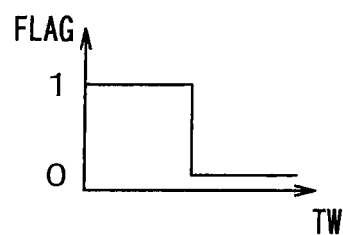
FIG. 35A is a diagram showing a flag used for a control process in the sixteenth embodiment.
Figure 35B:
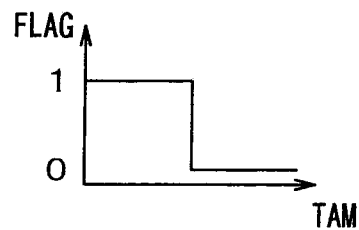
FIG. 35B is a diagram showing another flag used for the control process in the sixteenth embodiment.
Figure 35C:
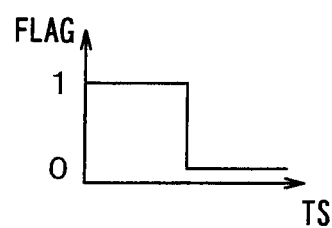
FIG. 35C is a diagram showing another flag used for the control process in the sixteenth embodiment.

All flags as used herein mean a flag indicative of a water temperature TW shown in FIG. 35A, a flag indicative of an outside air temperature TAM shown in FIG. 35B, and a flag indicative of a solar radiation amount TS shown in FIG. 35C. For the water temperature TW of a predetermined value or less, the outside air temperature TAM of another predetermined value or less, and the solar radiation amount TS of a further predetermined value or less, all flags become "1". In other words, when all conditions for causing the fogging of the window are satisfied, all flags become "1".

When all flags are determined to be "1" in step S600, the operation proceeds to step S510, in which the normal blowing mode switching control is performed. Specifically, since the TAO is in the region (6) (high-temperature region), the switching to the four-seat foot mode is performed.

When all flags are determined not to be "1" in step S600, the operation proceeds to step S540, in which one-seat prioritizing control is performed. Specifically, since the TAO is in the region (6), the switching to the intermediate foot mode is performed.

In this embodiment, under the conditions for causing the fogging of the window, the four-seat foot mode is performed at the time of the intermediate load in winter instead of the intermediate foot mode. Thus, the dispersed distribution of the temperature of the vehicle interior can be suppressed under the conditions for causing the fogging of the window, whereby the window fogging can also be suppressed effectively.

Seventeenth Embodiment

Although in the above sixteenth embodiment, the water temperature TW, the outside air temperature TAM, and the solar radiation amount TS are taken into consideration as the conditions for causing the fogging of the window, in a seventeenth embodiment, the vehicle speed SPD is also taken into account in addition to the water temperature TW, the outside air temperature TAM, and the solar radiation amount TS.

Figure 36A:
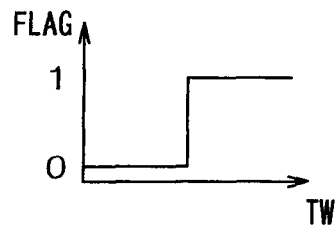
FIG. 36A is a diagram showing a flag used for a control process in a seventeenth embodiment.
Figure 36B:
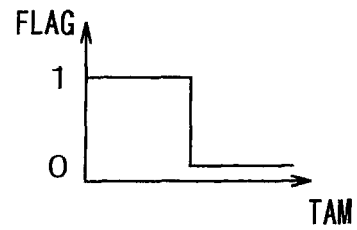
FIG. 36B is a diagram showing another flag used for the control process in the seventeenth embodiment.
Figure 36C:
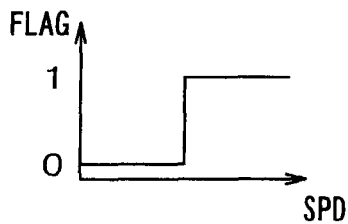
FIG. 36C is a diagram showing another flag used for the control process in the seventeenth embodiment.
Figure 36D:
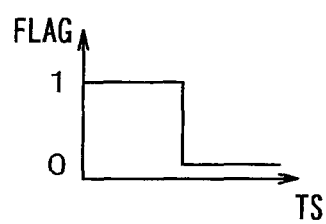
FIG. 36D is a diagram showing another flag used for the control process in the seventeenth embodiment.

That is, all flags used in step S600 of FIG. 34 include a flag regarding the water temperature TW shown in FIG. 36A, a flag regarding the outside air temperature TAM shown in FIG. 36B, a flag regarding the solar radiation amount TS shown in FIG. 36C, and a flag regarding the vehicle speed SPD shown in FIG. 36D. For the water temperature TW of a predetermined value or more, the outside air temperature TAM of another predetermined value or less, the solar radiation amount TS of another predetermined value or less, and the vehicle speed SPD of another predetermined value or more, all flags become "1".

In this embodiment, the vehicle speed SPD is also taken into account in addition to the water temperature TW, the outside air temperature TAM, and the solar radiation amount TS, which can determine whether the conditions for causing the fogging of a window is satisfied or not with higher accuracy, thereby more effectively suppressing the window fogging.

Eighteenth Embodiment

In an eighteenth embodiment, even when the one-seat prioritizing switch 62 is pushed, the one-seat prioritizing control is reset upon pushing the defroster switch 61, and then returned to the normal control process.

Figure 37:
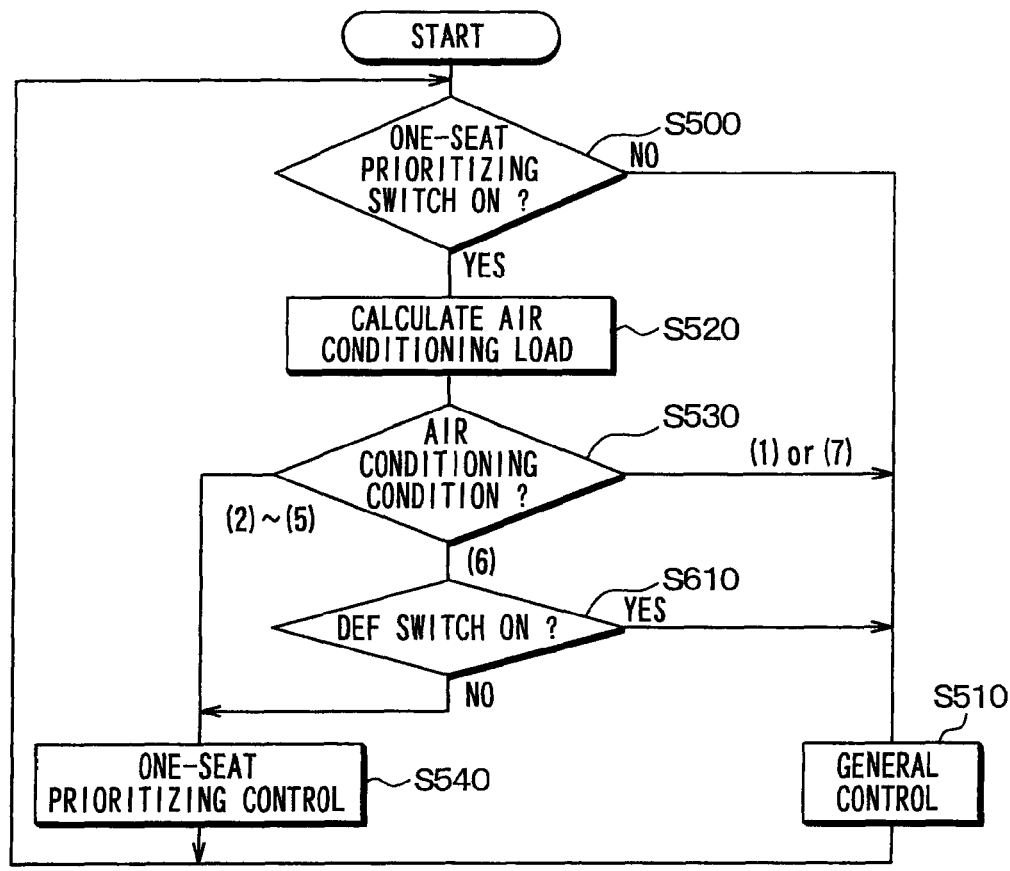
FIG. 37 is a flowchart showing a part of a control process performed in an eighteenth embodiment.

FIG. 37 is a flowchart showing a part of a control process performed in this embodiment, while illustrating step S610 added to the flowchart of FIG. 22. Specifically, when the TAO is determined to be in the region (6) in step S530, the operation proceeds to step S610, in which it is determined whether or not the defroster switch 61 is pushed. When the defroster switch 61 is determined to be pushed (if the DEF switch is turned ON), the operation proceeds to step S510, in which the normal control is performed. Specifically, since the defroster switch 61 is pushed, the defroster mode (defroster blowing mode) is performed.

When the defroster switch 61 is determined not to be pushed in step S610, the operation proceeds to step S540, in which the one-seat prioritizing control is performed. Specifically, when the TAO is determined to be in the region (6), the intermediate foot mode is performed.

In this embodiment, when there is an urgent necessity to prevent the fogging of a windowpane, the safety of driving can be ensured by giving more priority to the prevention of fogging of the window than to the one-seat prioritizing control.

Nineteenth Embodiment

In the above eighteenth embodiment, even when the one-seat prioritizing switch 62 is pushed, upon pushing the defroster switch 61 (upon turning off the DEF switch), the one-seat prioritizing control is reset and returned to the normal control. However, in a nineteenth embodiment, the conditioned air is also blown from the defroster air outlet 25 when the risk of fogging of the window is determined to be caused even upon pushing the one-seat prioritizing switch 62.

Figure 38A:
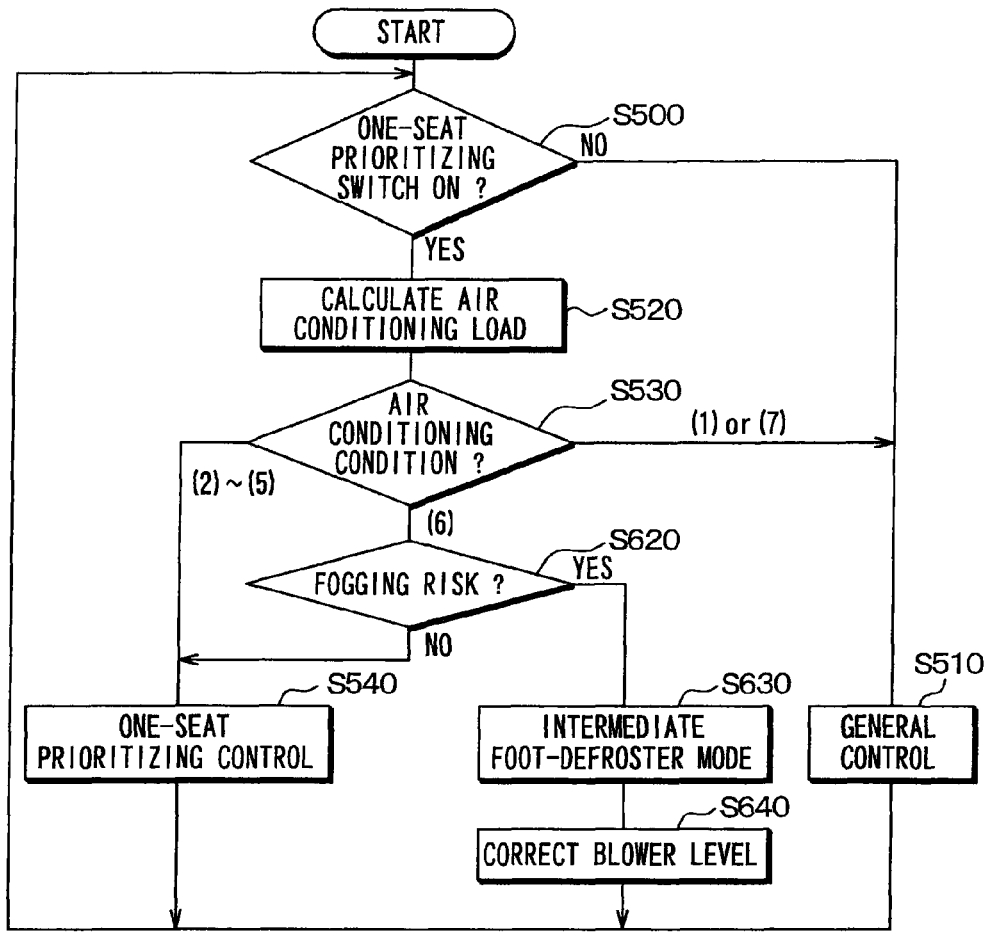
FIG. 38A is a flowchart showing a part of a control process performed in a nineteenth embodiment.

FIG. 38A is a flowchart showing a part of a control process performed in this embodiment, while illustrating steps S630 and S640 added to and step S620 provided in place of step S610 in the flowchart of FIG. 37.

Specifically, when the TAO is determined to be in the region (6) in step S530, the operation proceeds to step S620, in which it is determined whether or not the risk of fogging of the window is caused.

The presence or absence of the risk of the window fogging can be determined by various methods. For example, the risk of the window fogging may be determined by setting a humidity sensor in the windowpane and calculating the degree of fogging of the window. Alternatively, the risk of the window fogging may be determined based on at least one of the solar radiation amount TS, the outside air temperature TAM, the blower level, and the air outlet mode.

Figure 38B:
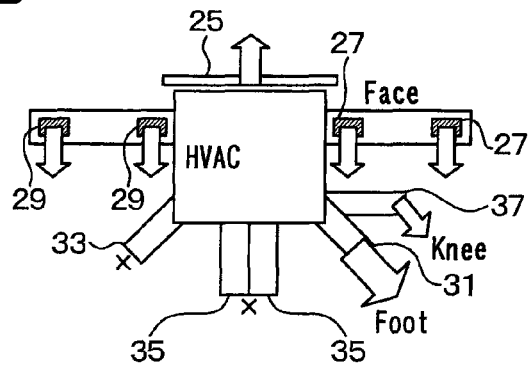
FIG. 38B is a diagram for explaining an intermediate foot defroster mode in the nineteenth embodiment.

When the risk of the window fogging is determined to be caused, the operation proceeds to step S630, in which the intermediate foot defroster mode (defroster blowing mode) is performed. The intermediate foot defroster mode is a mode in which the conditioned air is also blown from the defroster air outlet 25 as compared to the intermediate foot mode, as shown in FIG. 38B.

Then, the operation proceeds to step S640, in which the blower level is corrected to be increased. That is, since in the intermediate foot defroster mode, the conditioned air is also blown from the defroster air outlet 25, the flow amount of air blown toward the driver seat in the intermediate foot defroster mode is decreased as compared to that in the intermediate foot mode when the blower level in the intermediate foot mode is the same as that in the intermediate foot mode. For this reason, by increasing the blower level upon correcting in step S640, the flow amount of air blown toward the driver seat in the intermediate foot defroster mode is equal to that in the intermediate foot mode.

When there is an urgent necessity to prevent fogging of the windowpane, this embodiment can also improve the preventing characteristics of fogging of the windowpane.

Twentieth Embodiment

In a twentieth embodiment, the flow amount of air blown toward the driver seat upon introducing the outside air is controlled. Upon introducing the outside air, the flow amount of conditioned air is increased due to the ram pressure when the vehicle speed increases. Normally, the blower level is corrected to set the flow amount of air at the same level as that in the normal inside air mode so as to prevent the degradation of comfort to the passenger due to the flow amount of air increased unnecessarily. In the one-seat prioritizing control (one-seat concentration mode, or intermediate blowing mode), the air outlets other than the air outlet at the driver seat are closed, or restricted, so that the flow amount of the conditioned air possibly exceeds the limit of correction using the blower level.

Thus, when the vehicle speed is equal to or more than a predetermined vehicle speed in the one-seat prioritizing control and the outside air introduction mode, the air outlet on the non-driver-seat side is opened such that the flow amount of air blown into the driver-seat side is equal to that in the normal control (in the four-seat blowing mode). At this time, the degree of opening of the air outlet on the non-driver-seat side is calculated from information regarding the blowing mode, the degree of opening of the air outlet on the non-driver-seat side, the blower level, the vehicle speed, and the like. When the vehicle speed is very high, the flow amount of conditioned air leaking from the non-driver-seat side is increased according to the vehicle speed.

Figure 39A:
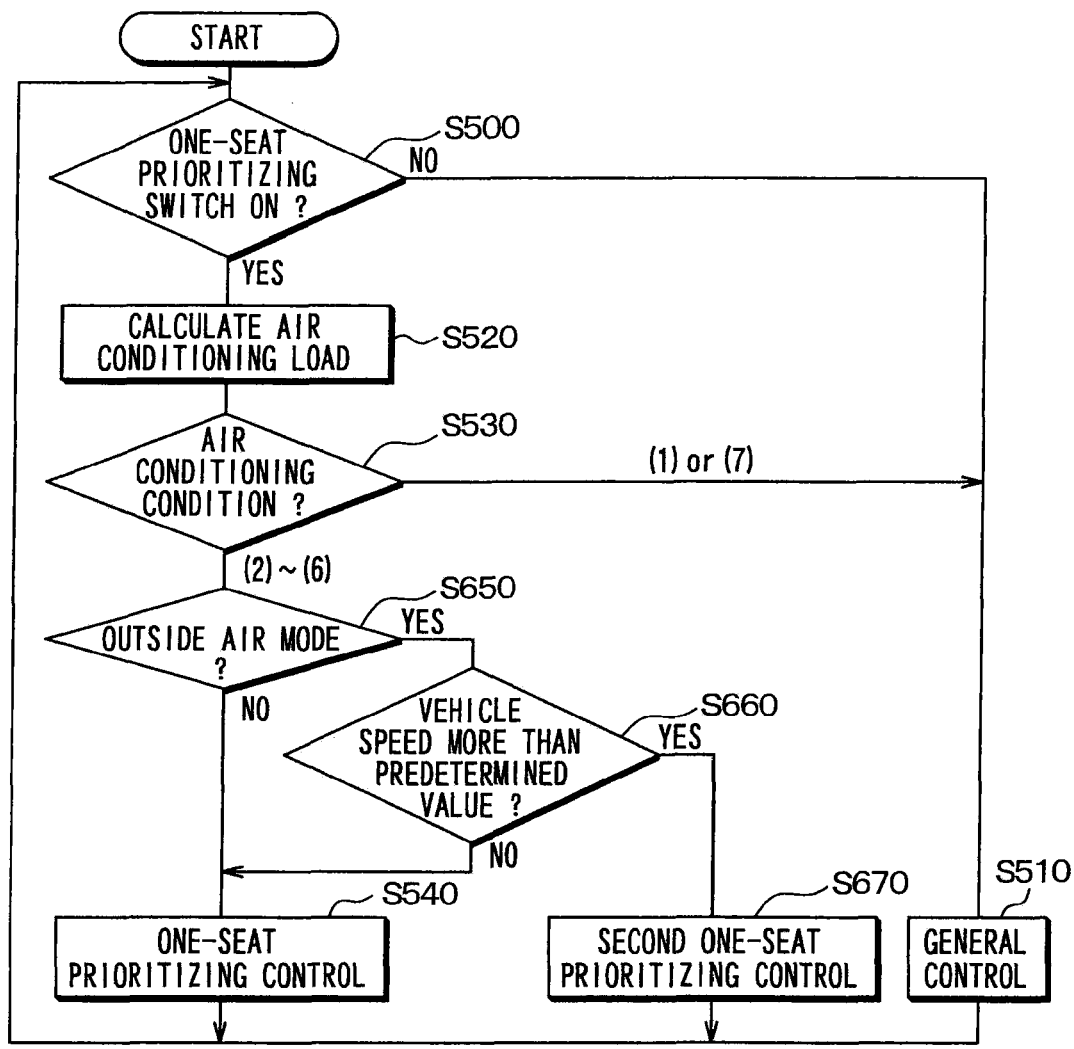
FIG. 39A is a flowchart showing a part of a control process performed in a twentieth embodiment.

FIG. 39A is a flowchart showing a part of a control process performed in this embodiment, while illustrating steps S650, S660, and S670 added to the flowchart of FIG. 22.

Specifically, when the TAO is determined to be in any one of the regions (2) to (6) in step S530, the operation proceeds to step S650, in which it is determined whether or not this state is in the outside air introduction mode (outside air mode). When this state is determined to be in the outside air introduction mode, the operation proceeds to step S660, in which it is determined whether or not the vehicle speed is equal to or more than a predetermined value. When the vehicle speed is determined to be equal to or more than the predetermined value, the operation proceeds to step S670, in which the second one-seat prioritizing control is performed.

The second one-seat prioritizing control differs from the one-seat prioritizing control shown in step S540 in degree of opening of the non-driver-seat side air outlet. Specifically, the degree of opening of the air outlet on the non-driver-seat side is calculated from information regarding the blowing mode, the degree of opening of the air outlet on the non-driver-seat side, the blower level, the vehicle speed, and the like. When the vehicle speed is very high, the flow amount of conditioned air leaking from the non-driver-seat side is increased according to the vehicle speed.

Figure 39B:
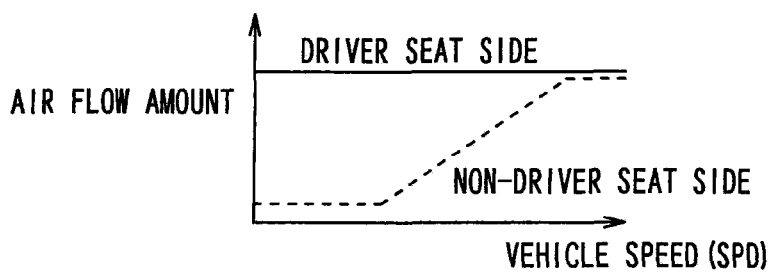
FIG. 39B is a diagram showing an example of the result of the control process performed in the twentieth embodiment.

FIG. 39B shows an example of the result of the second one-seat prioritizing control at the time of a certain thermal load. In this way, the degree of opening of the non-driver-seat side air outlet is increased with increasing vehicle speed to thereby increase the flow amount of air from the non-driver-seat side air outlet, so that the flow amount of air from the driver-seat side air outlet can be set substantially constant regardless of the vehicle speed.

When this state is determined not to be in the outside air introduction mode in step S650, or when the vehicle speed is determined not to be equal to or more than a predetermined value in step S660, the operation proceeds to step S540, in which the one-seat prioritizing control is performed.

Twenty-First Embodiment

In a twenty-first embodiment, switching to the four-seat foot mode, the intermediate foot mode, and the one-seat concentration foot mode is determined by incorporating therein a correction term for the solar radiation amount TS.

When the solar radiation amount becomes large, a thermal load different from the thermal load or an air conditioning load corresponding to the vehicle is felt by the passenger. Specifically, when the solar radiation amount becomes large in summer, the requirements for the air conditioning made by the passenger become high. When the solar radiation amount becomes large in winter, the requirements for the air conditioning made by the passenger become low. In this embodiment, the incorporation of the correction term corresponding to the solar radiation amount can effectively achieve both the comfort to the passenger and the power saving.

Figure 40:
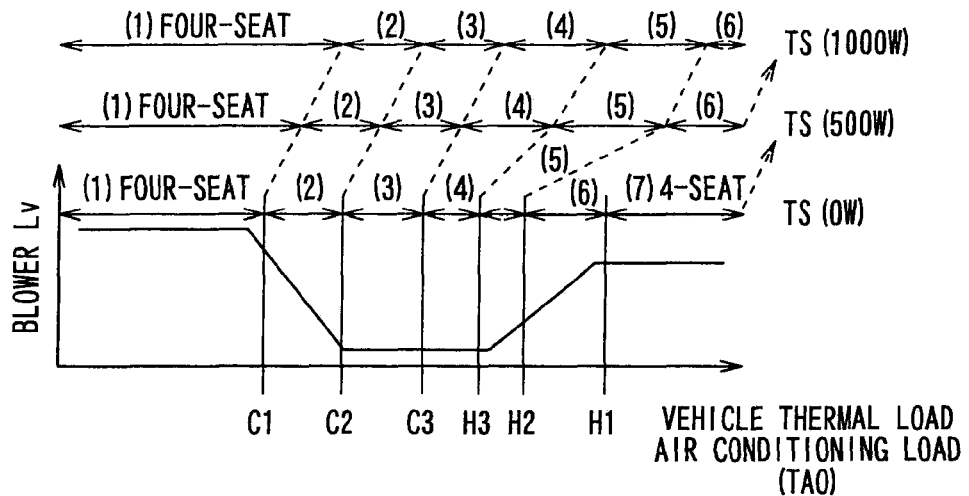
FIG. 40 is a diagram showing a control map used in a twenty-first embodiment.

Specifically, as shown in FIG. 40, when the solar radiation amount TS is more than a predetermined solar radiation amount, low-temperature side predetermined loads C1 to C3 and high-temperature side predetermined loads H1 to H3 are shifted to the higher temperature side (lower load cooling side, higher load heating side) of the TAO.

Thus, when the solar radiation amount is large in summer, the switching to a mode with a higher air conditioning capability is apt to be performed (that is, switching is performed from the one-seat concentration face to the intermediate face, and then the four-seat face). When the solar radiation amount is large in winter, the switching to a mode with a lower air conditioning capability is apt to be performed (that is, switching is performed from the four-seat foot to the intermediate foot, and then the one-seat concentration foot). Thus, both the comfort to the passenger and the power saving can be effectively achieved.

Twenty-Second Embodiment

In a twenty-second embodiment, when the occupation of the non-driver seat by the passenger is detected even in the one-seat prioritizing control, the one-seat prioritizing control is stopped and switched to the normal control.

Figure 41:
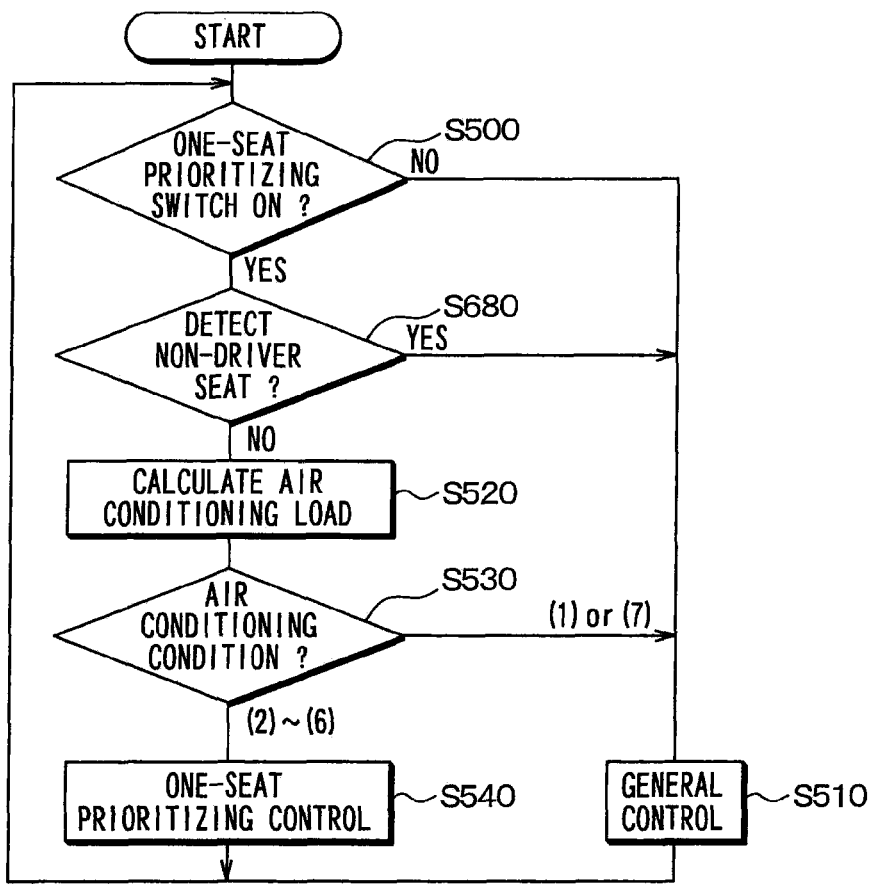
FIG. 41 is a flowchart showing a part of a control process performed in a twenty-second embodiment.

FIG. 41 is a flowchart showing a part of a control process performed in this embodiment, while illustrating step S680 added to the flowchart of FIG. 22. Specifically, when the one-seat prioritizing switch 62 is determined to be pushed (turned ON) in step S500 (if YES), the operation proceeds to step S680, in which it is determined whether or not the sensor 56 for detecting the occupied seat detects the passenger at the non-driver seat. In detail, it is determined whether or not a passenger occupies at least one of the front passenger seat and the rear seat, based on a detection signal from the occupied seat detecting sensor 56.

When the passenger at the non-driver seat is detected, the operation proceeds to step S510, in which the normal control is performed. When the passenger at the non-driver seat is not detected, the operation proceeds to step S520, in which the air conditioning load (TAO) is calculated.

In this embodiment, even when the passenger rides on the non-driver seat upon pushing the one-seat prioritizing switch 62, the switching to the normal control is automatically performed, so that the comfort to the passenger at the non-driver seat can be suitably ensured.

Twenty-Third Embodiment

In the above twenty-second embodiment, when the non-driver-seat side passenger sensor detects the passenger riding on the non-driver seat, the one-seat prioritizing control is stopped and switched to the normal control. However, in a twenty-third embodiment, when the non-driver-seat side air-conditioning switch (front-passenger-seat side air-conditioning switch 64 or rear-seat side air conditioning switch 65) is operated, the one-seat prioritizing control is stopped and switched to the normal control.

Figure 42:
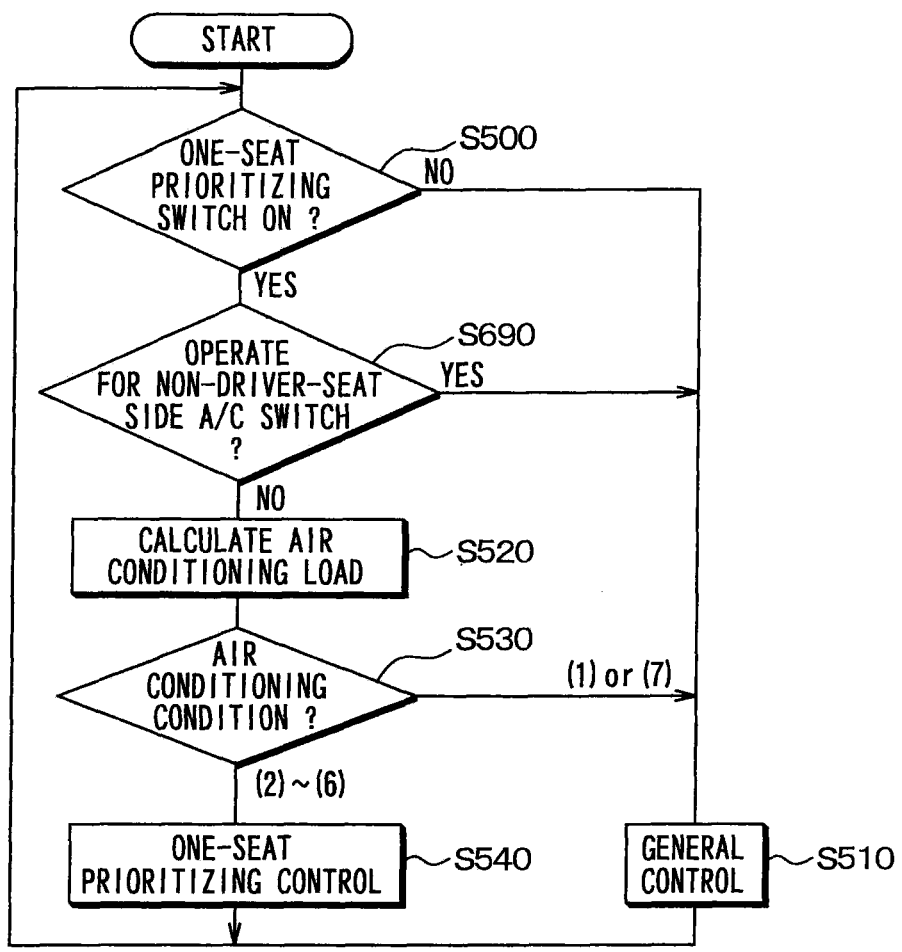
FIG. 42 is a flowchart showing a part of a control process performed in a twenty-third embodiment.

FIG. 42 is a flowchart showing a part of a control process performed in this embodiment, while illustrating step S690 in place of step S680 in the flowchart of FIG. 41. Specifically, when the one-seat prioritizing switch 62 is determined to be pushed (turned ON) in step S500 (if YES), the operation proceeds to step S690, in which it is determined whether the operation of the non-driver-seat side air-conditioning switches 64 and 65 are operated or not. For example, it is determined whether or not the non-driver-seat side air-conditioning switches 64 and 65 are operated during the last certain time period.

When the operation of the non-driver-seat side air-conditioning switches 64 and 65 are operated, the operation proceeds to step S510, in which the normal control is performed. When the non-driver-seat side air-conditioning switches 64 and 65 are not operated, the operation proceeds to step S520, in which an air conditioning load (TAO) is calculated.

Thus, the one-seat prioritizing control can be switched to the normal control by requests from the passenger at the non-driver seat even upon pushing the one-seat prioritizing switch 62. At this time, the existing switches 64 and 65 are used to make a request for switching to the normal control, so that the one-seat prioritizing control can be switched to the normal control without using a dedicated selector switch.

OTHER EMBODIMENTS

Although in the above respective embodiments, the TAO (target air outlet temperature) is used as an index indicative of a thermal load of the vehicle or the degree of an air conditioning load, the invention is not limited thereto. The thermal load or air conditioning load in the vehicle may be calculated based on at least one of the outside air temperature TAM, the solar radiation amount TS, the vehicle interior temperature TR, and the air-conditioning set temperature TSET.

Although in the above embodiments, the seat air conditioner 43 and the seat heater 44 are disposed at the driver seat, the seat air conditioner 43 and the seat heater 44 may be disposed at each of the front passenger seat and the rear seat. In this case, preferably, when the one-seat prioritizing switch 62 is not pushed, the seat air conditioners 43 or seat heaters 44 for all seats are operated. Alternatively, when the one-seat prioritizing switch 62 is pushed, only the seat air conditioner 43 or seat heater 44 for the driver seat is operated, and the seat air conditioners 43 or the seat heaters 44 for the front passenger seat and the rear seat is stopped. This arrangement can achieve the energy saving.

In the above first to sixth embodiments, the degree of opening of the air outlet is adjusted to change the flow amount of air blown therefrom, which results in a change in air conditioning capability. Means for changing the air conditioning capability is not limited thereto.

For example, the flow amount of blown air may changed by adjusting the flow amount of blast air, which may result in a change in air conditioning capability. The ratio of hot air to cool air may be adjusted by an air mix door to change the temperature of the blown air, which may result in a change in air conditioning capability. The amount of exchanged heat in at least one of the evaporator and the heater core may be adjusted to change the temperature of the blown air, resulting in a change in air conditioning capability.

What is claimed is:

1. An air conditioner for a vehicle, comprising:
    a single blower that blows air into a vehicle compartment having a specific region in which an occupant is sitting and a non-specific region in which no occupant is sitting;
    a plurality of air outlets that blow the air blown by the single blower into the vehicle compartment;
    an air-conditioning mode switching portion that switches between air conditioning modes by opening or closing the plurality of air outlets; and
    a controller that controls an operation of the air-conditioning mode switching portion, wherein
    the air conditioning modes include:
        a normal air conditioning mode in which air conditioning is performed both in the specific region and the non-specific region; and
        a specific-region prioritizing air conditioning mode in which a volume of air that is blown to the non-specific region is decreased as compared to a volume of air that is blown to the non-specific region in the normal air conditioning mode,
    the plurality of air outlets include:
        a specific-region side air outlet that blows air to the specific region; and
        a non-specific-region side air outlet that blows air to the non-specific region,
    the controller starts operating the specific region prioritizing air conditioning mode when an occupant detection sensor detects that an occupant is present only in the specific region, and
    when the specific-region prioritizing air conditioning mode is performed, the controller controls the air-conditioning mode switching portion to keep the air flow consistent then calculates a blower suction pressure such that if the blower suction pressure increases then the controller increases an opening degree of the non-specific-region side air outlet, so as to decrease the volume of air that is blown to the specific region relatively by increasing the volume of air that is blown to the non-specific region.

2. The air conditioner for a vehicle according to claim 1, wherein
    the blower suction pressure is a pressure of the air drawn into the single blower, and
    the controller calculates the blower suction pressure based on at least one of (i) a vehicle speed, (ii) an operation state of an inside/outside air switching portion, which adjusts a flow ratio of air inside the vehicle compartment to air outside the vehicle compartment, introduced into the single blower, and (iii) an operation state of a ram pressure reducing device which reduces a ram pressure during traveling.

3. The air conditioner for a vehicle according to claim 1, wherein
    when the specific-region prioritizing air conditioning mode is performed, the controller controls the air-conditioning mode switching portion to adjust the volume of air that is blown to the non-specific region based on an air conditioning load and the blower suction pressure.

4. The air conditioner for a vehicle according to claim 1, wherein
    when fogging of a window is determined to be caused in the specific-region prioritizing air conditioning mode, the controller increases the volume of air that is blown to the non-specific region, or switches the specific-region prioritizing air conditioning mode to the normal air conditioning mode.

5. The air conditioner for a vehicle according to claim 1, further comprising
    an air conditioning operation portion that sets an air conditioning for the specific region and an air conditioning for the non-specific region independently, wherein
    when the air conditioning operation portion sets the air conditioning for the non-specific region in the specific-region prioritizing air conditioning mode, the controller increases the volume of air that is blown to the non-specific region, or switches the specific-region prioritizing air conditioning mode to the normal air conditioning mode.

6. The air conditioner for a vehicle according to claim 1, wherein
    when the specific-region prioritizing air conditioning mode is performed, the air-conditioning mode switching portion changes at least one of the volume of air that is blown to the specific region and the volume of air that is blown to the non-specific region over time.

7. The air conditioner for a vehicle according to claim 1, further comprising:
    a defroster air outlet that is included in the plurality of air outlets and blows air to a window;
    a specific-region side door that is included in the air-conditioning mode switching portion and adjusts an opening degree of the specific-region side air outlet;
    a non-specific region side door that is included in the air-conditioning mode switching portion and adjusts an opening degree of the non-specific region side air outlet;
    a defroster door that is included in the air-conditioning mode switching portion and adjusts an opening degree of the defroster air outlet;
    a specific-region side link mechanism that drives the specific-region side door and the defroster door in cooperation with each other; and
    a non-specific region side link mechanism that drives the non-specific region side door, wherein
    the controller controls, in a defroster mode:
        the specific-region side link mechanism to drive the defroster door to open the defroster opening and to drive the specific-region side door to completely close the specific-region side air outlet; and
the non-specific region side link mechanism to drive the non-specific region side door to completely close the non-specific region side air outlet,
the controller controls, in a non-defroster mode:
the specific-region side link mechanism to drive the specific-region side door to open the specific-region side air outlet; and
the non-specific region side link mechanism to drive the non-specific region side door to open the non-specific side air outlet,
when the specific-region prioritizing air conditioning mode is performed, the controller controls the specific-region side link mechanism to set the non-defroster mode, and controls the non-specific region side link mechanism to set the defroster mode.

8. The air conditioner for a vehicle according to claim 1, wherein
the controller controls the air-conditioning mode switching portion to set the normal air conditioning mode (i) when passengers occupy seats in the specific region or (ii) when a specific-region prioritizing switch for setting the specific region prioritizing air conditioning mode is not operated, and
the controller controls the air-conditioning mode switching portion to set the specific-region prioritizing air conditioning mode (iii) when no passenger occupies a seat in the non-specific region, or (iv) when the specific-region prioritizing switch is operated.

9. The air conditioner for a vehicle according to claim 1, wherein
the blower suction pressure is a ram pressure generated by an air flow caused by movement of the vehicle.

10. The air conditioner for a vehicle according to claim 1, wherein
when the specific-region prioritizing mode is performed, the controller increases only the volume of air that is blown to the non-specific region as the blower suction pressure becomes higher.

11. The air conditioner for a vehicle according to claim 1, wherein
the specific region includes a driver seat.

12. An air conditioner for a vehicle, comprising:
a single blower that blows air into a vehicle compartment having a specific region in which an occupant is sitting and a non-specific region in which no occupant is sitting;
a plurality of air outlets that blow the air blown by the single blower to the vehicle compartment;
an air-conditioning mode switching portion that switches between air conditioning modes by opening or closing the plurality of air outlets; and
a controller that controls an operation of the air-conditioning mode switching portion, wherein
the air conditioning modes include:
a normal air conditioning mode in which air conditioning is performed both in the specific region and the non-specific region; and
a specific-region prioritizing air conditioning mode in which a volume of air that is blown to the non-specific region is decreased as compared to a volume of air that is blown to the non-specific region in the normal air conditioning mode,
the plurality of air outlets include:
a specific-region side air outlet that blows air to the specific region; and
a non-specific-region side air outlet that blows air to the non-specific region,
the controller starts operating the specific region prioritizing air conditioning mode when an occupant detection sensor detects that an occupant is present only in the specific region,
when the specific-region prioritizing air conditioning mode is performed, the controller controls the air-conditioning mode switching portion to keep the air flow consistent then calculates a blower suction pressure such that if the blower suction pressure increases then the controller increases an opening degree of the non-specific-region side air outlet, so as to decrease the volume of air that is blown to the specific region relatively by increasing the volume of air that is blown to the non-specific region, and
the controller individually controls the volume of air that is blown to the specific region separate from the volume of air that is blown to the non-specific region.

13. An air conditioner for a vehicle, comprising:
a single blower that blows air into a vehicle compartment having a specific region in which an occupant is sitting and a non-specific region in which no occupant is sitting;
a plurality of air outlets that blow the air blown by the single blower into the vehicle compartment;
an air-conditioning mode switching portion that switches between air conditioning modes by opening or closing the plurality of air outlets; and
a controller that controls an operation of the air-conditioning mode switching portion, wherein
the air conditioning modes include:
a normal air conditioning mode in which air conditioning is performed both in the specific region and the non-specific region; and
a specific-region prioritizing air conditioning mode in which a volume of air that is blown to the non-specific region is decreased as compared to a volume of air that is blown to the non-specific region in the normal air conditioning mode,
the plurality of air outlets include:
a specific-region side air outlet that blows air to the specific region; and
a non-specific-region side air outlet that blows air to the non-specific region,
the controller starts operating the specific region prioritizing air conditioning mode when an occupant detection sensor detects that an occupant is present only in the specific region, and
when the specific-region prioritizing air conditioning mode is performed, the controller
controls the air-conditioning mode switching portion to keep the air flow consistent then calculates a blower suction pressure and an air conditioning load and
increases an opening degree of the non-specific-region side air outlet when the air conditioning load increases, so as to decrease the volume of air that is blown to the specific region relatively by increasing the volume of air that is blown to the non-specific region.

14. The air conditioner for a vehicle according to claim 13, wherein
the controller calculates the air conditioning load based on at least one of an outside air temperature, a solar radiation amount, a temperature of a vehicle interior, an air-conditioning set temperature, and a surface temperature of a passenger.

15. The air conditioner for a vehicle according to claim 13, wherein
the specific-region prioritizing air conditioning mode includes:
a low-load air conditioning mode; and
a high-load air conditioning mode in which a larger volume of air is blown into the space in the vehicle compartment than in the low-load air conditioning mode,
the controller controls the air-conditioning mode switching portion to set the low-load air conditioning mode when the air conditioning load is less than a predetermine load, and
the controller controls the air-conditioning mode switching portion to set the high-load air conditioning mode when the air conditioning load is larger than the predetermined load.

16. The air conditioner for a vehicle according to claim 15, further comprising
an energy-saving mode setting portion that sets an energy saving mode for saving power to perform the air conditioning, wherein
the controller shifts the predetermined load to a higher load side when the energy saving mode is set.

17. The air conditioner for a vehicle according to claim 15, wherein
the controller shifts the predetermined load to the higher load side when an auxiliary air conditioning device is operated.

18. The air conditioner for a vehicle according to claim 15, wherein
the air conditioning load is a cooling load, the controller shifts the predetermined load to a lower load side in the cooling load when a solar radiation amount is greater than a predetermined solar radiation amount.

19. The air conditioner for a vehicle according to claim 15, wherein
the air conditioning load is a heating load, the controller shifts the predetermined load to a higher load side in the heating load when a solar radiation amount is greater than a predetermined solar radiation amount.

* * * * *